US007231346B2

(12) United States Patent
Yamato et al.

(10) Patent No.: US 7,231,346 B2

(45) Date of Patent: Jun. 12, 2007

(54) SPEECH SECTION DETECTION APPARATUS

(75) Inventors: Toshitaka Yamato, Kobe (JP); Hideki Kitao, Kobe (JP); Shinichi Iwamoto, Kobe (JP); Osamu Iwata, Kobe (JP); Masataka Nakamura, Hiroshima (JP); Yoshinao Oomoto, Mitaka (JP)

(73) Assignee: Fujitsu Ten Limited, Kobe-shi (JP)

( * ) Notice: Subject to any disclaimer, the term of this patent is extended or adjusted under 35 U.S.C. 154(b) by 839 days.

(21) Appl. No.: 10/401,107

(22) Filed: Mar. 26, 2003

(65) Prior Publication Data

US 2004/0193406 A1 Sep. 30, 2004

(51) Int. Cl.
*G10L 15/20* (2006.01)

(52) U.S. Cl. ...................... 704/233; 704/226; 704/253; 704/207

(58) Field of Classification Search ................ 704/207, 704/226, 233, 253, 219, 268
See application file for complete search history.

(56) References Cited

U.S. PATENT DOCUMENTS

| | | | | |
|---|---|---|---|---|
| 4,959,865 | A * | 9/1990 | Stettiner et al. | 704/233 |
| 5,121,428 | A * | 6/1992 | Uchiyama et al. | 704/243 |
| 5,123,048 | A * | 6/1992 | Miyamae et al. | 704/246 |
| 5,596,680 | A * | 1/1997 | Chow et al. | 704/248 |
| 5,774,837 | A * | 6/1998 | Yeldener et al. | 704/208 |
| 6,782,360 | B1 * | 8/2004 | Gao et al. | 704/222 |
| 6,871,176 | B2 * | 3/2005 | Choi et al. | 704/223 |

FOREIGN PATENT DOCUMENTS

JP 9-50297 2/1987

OTHER PUBLICATIONS

Patent Abstract of Japan, Publication No. 09-050297, Published on Feb. 18, 1997, in the Name of Nakamura Masataka, et al.

* cited by examiner

*Primary Examiner*—Vijay Chawan
(74) *Attorney, Agent, or Firm*—Christie, Parker & Hale, LLP

(57) ABSTRACT

A speech section detection apparatus capable of reliably detecting a speech section even for a word containing a glottal stop sound or for a word containing a succession of "s" column sounds or "h" column sounds (sounds in the third column or the sixth column in the Japanese Goju-on Zu syllabary table). A speech signal detected by a microphone is amplified by a line amplifier, and converted by an analog/digital converter into a digital signal which is then stored in a memory. The stored speech signal is fetched into a pitch detector where a speech pitch is extracted by processing the speech signal in time domain. A gate signal generator controls the gate signal based on the speech pitch, and a speech section signal generator controls a speech section signal based on the gate signal. A word can be extracted by segmenting the speech signal stored in the memory in accordance with the speech section signal.

12 Claims, 23 Drawing Sheets

PITCH DETECTION ROUTINE

PREPROCESSING ROUTINE

PITCH DETECTION ROUTINE

ENVELOPE VALUE DIFFERENCE CALCULATION ROUTINE

PITCH PERIOD DETECTION PROCESSING ROUTINE

FIRST GATE SIGNAL GENERATION ROUTINE

SPEECH SECTION SIGNAL GENERATION ROUTINE

CLOSED STATE MAINTAINING PROCESSING ROUTINE

GATE OPENING PROCESSING ROUTINE

OPEN STATE MAINTAINING PROCESSING ROUTINE

SPEECH SECTION DETECTION APPARATUS

BACKGROUND OF THE INVENTION

1. Field of the Invention

The present invention relates to a speech section detection apparatus, and more particularly to a speech section detection apparatus capable of reliably detecting a speech section even for a word containing a glottal stop sound or for a word containing a succession of "s" column sounds (sounds belonging to the third column in the Japanese Goju-on Zu syllabary table) or "h" column sounds (sounds belonging to the sixth column in the same table).

2. Description of the Related Art

In speech recognition, speech sections, based on which speech is recognized, must be extracted from a time-series signal captured through a microphone. There is proposed a method that takes a period during which the short-duration power of speech is greater than a predetermined threshold as a speech section but, with this method, it has been difficult to achieve sufficient accuracy for speaker-independent systems intended to recognize a large variety of words spoken by unspecified speakers.

The applicant has previously proposed a pitch period extraction apparatus and method that can detect with high accuracy a pitch, the highness or lowness of tone, in a time domain, from a speech signal (Japanese Unexamined Patent Publication No. 9-50297), but it is also possible to determine a speech section based on the pitch period.

However, in the case of a word A which contains a glottal stop sound in the word (for example, Japanese word "chisso"), a word B which contains a succession of "s" column sounds (sounds in the third column in the Japanese Goju-on Zu syllabary table) (for example, Japanese word "sushiya"), or a word C which contains a succession of "h" column sounds (sounds in the sixth column in the Japanese Goju-on Zu syllabary table) (for example, Japanese word "hihuka"), it has not been possible to avoid the possibility of erroneous detection resulting from a failure to detect all the constituent sounds of the word as one continuous speech section.

FIGS. 1A, 1B, and 1C show the speech section detection results obtained according to the prior art pitch period detection method. FIG. 1A shows the speech section detection result for the "word A", FIG. 1B for the "word B", and FIG. 1C for the "word C". In each figure, the upper part shows the speech signal, and the lower part the detected speech section.

As can be seen from the figures, in the case of the "word A", the sound in the first half of the word ("chi" in the Japanese word "chisso") is detected in the speech section, but the sound in the last half ("sso" in the Japanese word "chisso") is not detected.

In the case of the Japanese word "sushiya", there is a break in the speech section between "sushi" and "ya", while in the case of the Japanese word "hihuka", there is a break between "hifu" and "ka"; in either case, the word is not detected as one continuous speech section.

Possible causes for such erroneous detection include the following.

A: In the word A, the fricative "ss" that follows the glottal stop, and in the word B, the fricative "sh" that follows the "s" column sound "su", are not only low in level but also difficult to differentiate from noise, and as a result, it is difficult to detect the pitch period itself.

B: When there is no aspirated sound part or noise part preceding the word, and when the tone is low, the pitch period cannot be detected.

C: In the case of the word C, there is a relatively long pause between the series of "h" sounds ("hihu" in the Japanese word "hihuka") and the succeeding sound ("ka" in the Japanese word "hihuka").

D: Noise during a pause.

SUMMARY OF THE INVENTION

The present invention has been devised in view of the above problem, and it is an object of the invention to provide a speech section detection apparatus capable of reliably detecting a speech section even for a word containing a glottal stop sound or for a word containing a succession of "s" column sounds or "h" column sounds.

A speech section detection apparatus according to a first aspect of the invention comprises: preprocessing means for removing noise contained in a speech signal; speech pitch extracting means for extracting a speech pitch signal from the speech signal from which noise has been removed by the preprocessing means; gate signal generating means for generating a gate signal based on the speech pitch extracted by the speech pitch extracting means; and speech section signal generating means for generating a speech section signal based on the gate signal generated by the gate signal generating means. In this apparatus, the gate signal is controlled based on the speech pitch extracted from the speech signal, and the speech section signal is controlled based on this gate signal.

In a speech section detection apparatus according to a second aspect of the invention, the apparatus further comprises speech signal segmenting means for segmenting the speech signal, from which noise has been removed by the preprocessing means, into a plurality of speech sections based on the speech section signal generated by the speech section signal generating means. In this apparatus, the speech signal is segmented into a plurality of speech sections based on the speech section signal.

In a speech section detection apparatus according to a third aspect of the invention, the speech pitch extracting means comprises: subtraction processing means for applying subtraction processing, for removing any speech signal smaller than a prescribed amplitude, to the speech signal from which noise has been removed by the preprocessing means; constant amplitude means for making essentially constant the amplitude of the speech signal to which the subtraction processing has been applied by the subtraction processing means; negative peak emphasizing means for detecting a positive peak and a negative peak subsequent to the positive peak from the speech signal whose amplitude has been made essentially constant by the constant amplitude means, and for generating a speech signal whose negative peak is emphasized by subtracting the positive peak from the negative peak; and differentiating means for detecting the speech signal whose negative peak has been emphasized by the negative peak emphasizing means, and for differentiating the detected signal. In this apparatus, the speech pitch is extracted by processing the speech signal in a time domain.

In a speech section detection apparatus according to a fourth aspect of the invention, the subtraction processing means comprises: envelope difference calculating means for calculating a positive envelope and a negative envelope of the speech signal from which noise has been removed by the preprocessing means, and for calculating an envelope difference representing the difference between the positive envelope and the negative envelope; subtraction processing threshold value calculating means for calculating a subtraction processing threshold value by multiplying the envelope difference calculated by the envelope difference calculating means by a prescribed coefficient factor; and subtraction processing threshold value subtracting means for subtracting the subtraction processing threshold value from the amplitude of the speech signal when the amplitude of the speech signal from which noise has been removed by the preprocessing means is equal to or greater than the subtraction processing threshold value calculated by the subtraction processing threshold value calculating means. In this apparatus, the subtraction processing threshold value is calculated by multiplying the envelope difference of the speech signal by a prescribed factor.

In a speech section detection apparatus according to a fifth aspect of the invention, the subtraction processing means further comprises zero setting means for setting the amplitude of the speech signal to zero when the amplitude of the speech signal from which noise has been removed by the preprocessing means is smaller than the subtraction processing threshold value calculated by the subtraction processing threshold value calculating means. In this apparatus, when the amplitude of the speech signal is smaller than the subtraction processing threshold value, the amplitude of the speech signal is set to zero.

In a speech section detection apparatus according to a sixth aspect of the invention, the constant amplitude means comprises: envelope difference calculating means for calculating a positive envelope and a negative envelope of the speech signal from which noise has been removed by the preprocessing means, and for calculating an envelope difference representing the difference between the positive envelope and the negative envelope; maximum envelope difference holding means for holding a maximum envelope difference out of envelope differences previously calculated by the envelope difference calculating means; and constant-amplitude gain calculating means for calculating a constant-amplitude gain by dividing by the present envelope difference the maximum envelope difference held by the maximum envelope difference holding means. In this apparatus, the constant-amplitude gain is determined based on the envelope difference of the speech signal.

In a speech section detection apparatus according to a seventh aspect of the invention, the constant amplitude means further comprises: unity gain setting means for setting the constant-amplitude gain to unity gain when the constant-amplitude gain calculated by the constant-amplitude gain calculating means is equal to or larger than a predetermined threshold value. In this apparatus, when the constant-amplitude gain is equal to or larger than the predetermined threshold value, the constant-amplitude gain is set to unity gain.

In a speech section detection apparatus according to an eighth aspect of the invention, the gate signal generating means comprises gate signal opening means for opening the gate signal when an average value taken over a predetermined number of consecutive speech pitches extracted by the speech pitch extracting means becomes equal to or larger than a predetermined gate opening threshold value. In this apparatus, when the average value of the predetermined number of speech pitches becomes equal to or larger than the predetermined gate opening threshold value, the gate signal is opened.

In a speech section detection apparatus according to a ninth aspect of the invention, the gate signal generating means further comprises gate signal open state maintaining means for maintaining the gate signal in an open state once the gate signal is opened by the gate signal opening means, as long as the average value of the predetermined number of consecutive speech pitches extracted by the speech pitch extracting means does not become smaller than a gate closing threshold value which is smaller than the gate opening threshold value. In this apparatus, the gate signal is maintained in an open state as long as the average value of the predetermined number of consecutive speech pitches does not become smaller than the gate closing threshold value In a speech section detection apparatus according to a 10th aspect of the invention, the gate signal generating means further comprises gate signal closing means for closing the gate signal when the average value of the predetermined number of consecutive speech pitches extracted by the speech pitch extracting means becomes smaller than the gate closing threshold value. In this apparatus, when the speech pitch average value becomes smaller than the gate closing threshold value, the gate signal is closed.

In a speech section detection apparatus according to an 11th aspect of the invention, the speech section signal generating means comprises: first prescribed period counting means for counting a first prescribed period from the time the gate signal generated by the gate signal generating means is opened; and speech section signal opening means for setting the speech section signal open by going back in time for a second prescribed period from the time the counting of the first prescribed period by the first prescribed period counting means is completed. In this apparatus, when the gate signal has remained open continuously for the first prescribed period, the speech section signal is set open by going back in time for the second prescribed period from the end of the first prescribed period.

In a speech section detection apparatus according to a 12th aspect of the invention, the speech section signal generating means further comprises: third prescribed period counting means for counting a third prescribed period from the time the gate signal generated by the gate signal generating means is closed; and speech section signal closing means for closing the speech section signal when the counting of the third prescribed period by the third prescribed period counting means is completed. In this apparatus, the speech section signal is closed when the third prescribed period has elapsed from the time the gate signal was closed.

In a speech section detection apparatus according to a 13th aspect of the invention, the speech section signal generating means further comprises speech section signal open state maintaining means for maintaining the speech section signal in an open state when the speech section signal is set open by the speech section signal opening means by going back in time for the second prescribed period before the counting of the third prescribed period by the third prescribed period counting means is completed. In this apparatus, the speech section signal is maintained in an open state when the third prescribed period and the second prescribed period overlap each other.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Figure 1A:
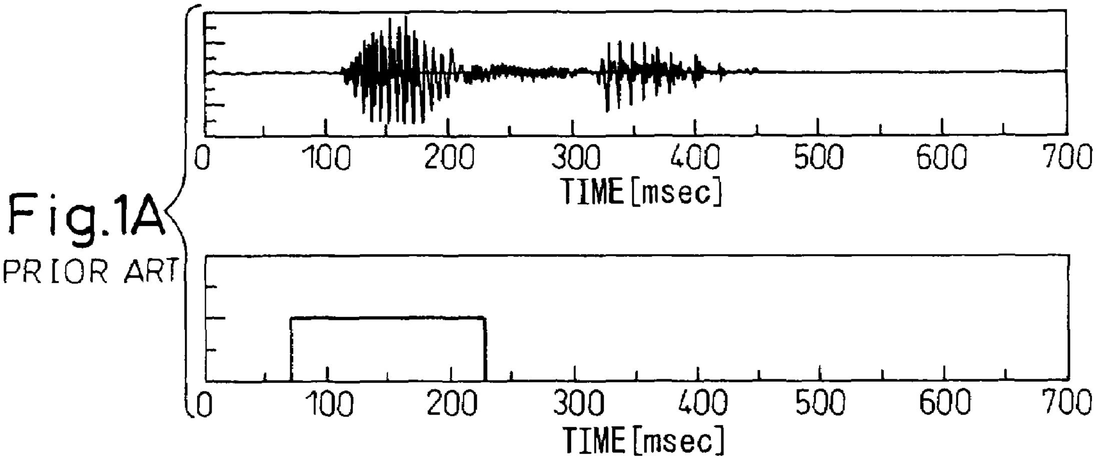
Fig.1A PRIOR ART
FIGS. 1A, 1B, and 1C are diagrams showing speech section detection results based on a pitch period according to the prior art.
Figure 1B:
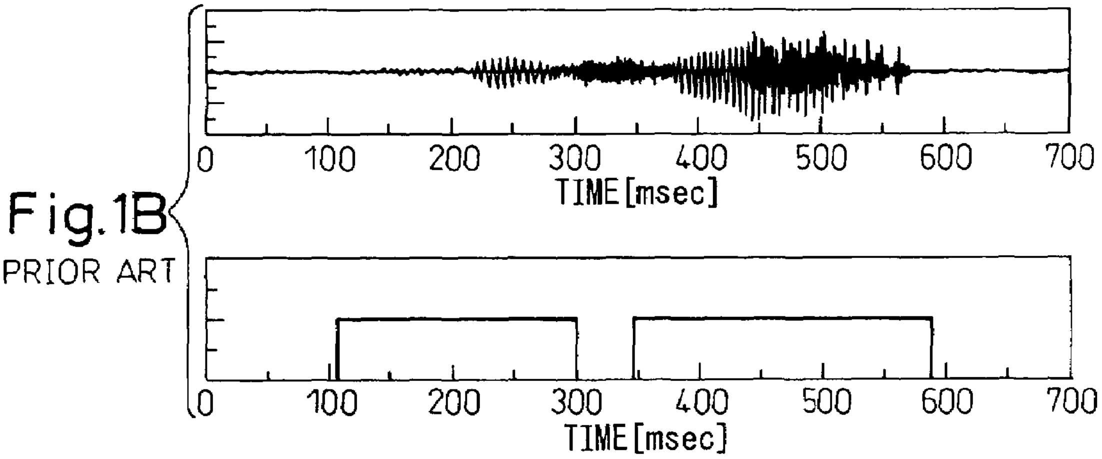
Fig.1B PRIOR ART
Figure 1C:
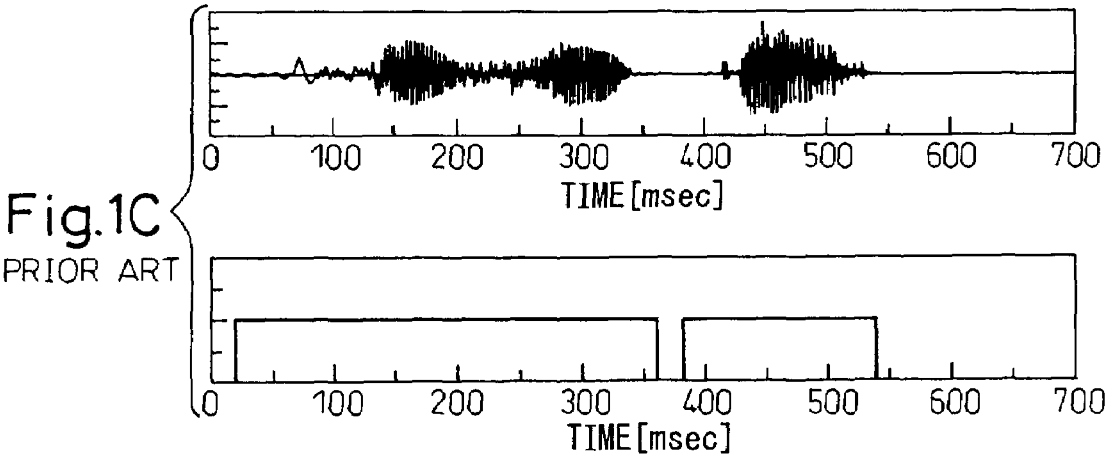
Fig.1C PRIOR ART
Figure 2:
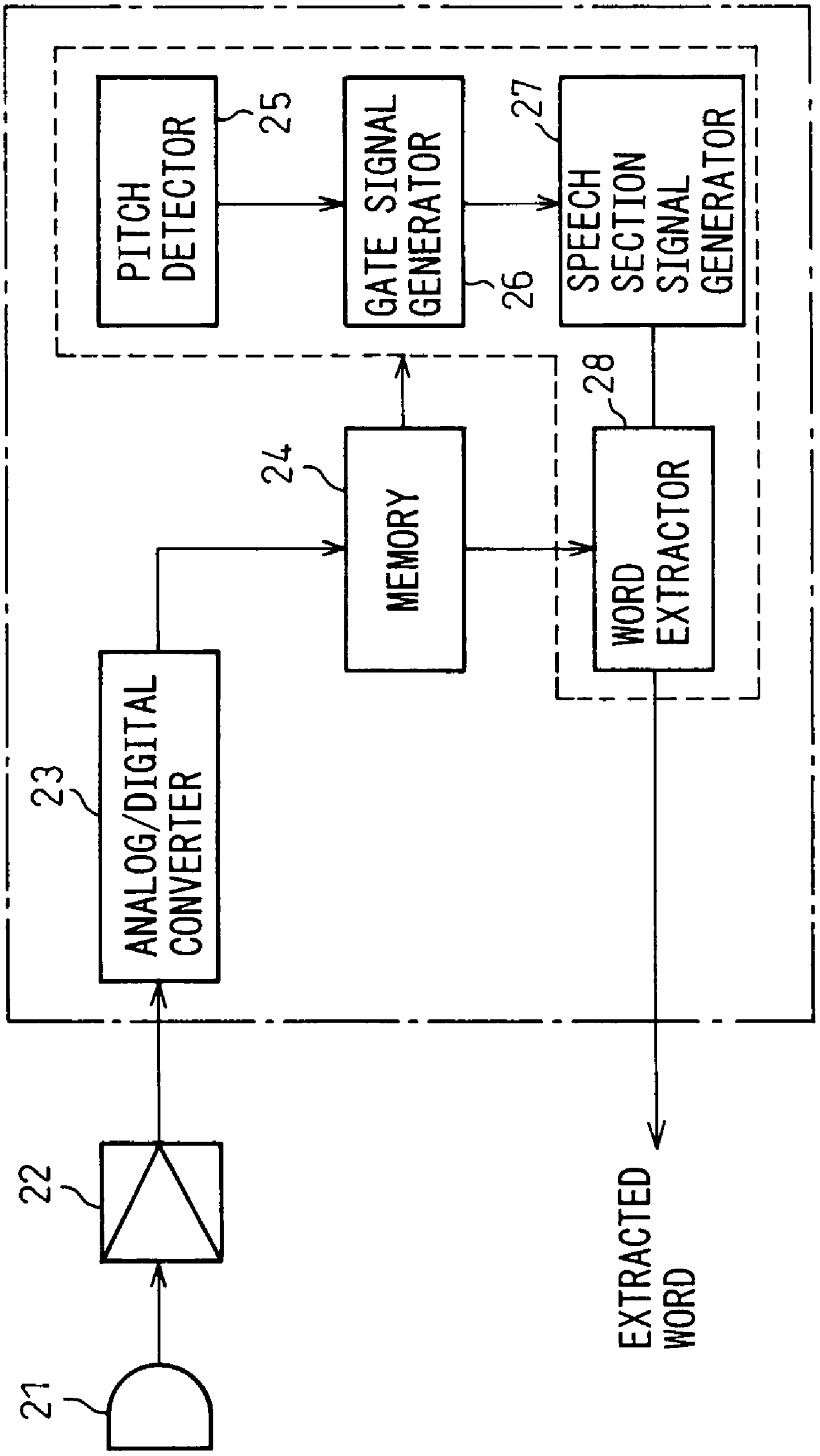
FIG. 2 is a diagram showing the functional configuration of a speech section detection apparatus according to the present invention.

FIG. 2 is a diagram showing the functional configuration of a speech section detection apparatus according to the present invention. A speech signal converted into an electrical signal by a microphone 21 is first amplified by a line amplifier 22, and then sampled at intervals of every predetermined sampling time Δt by an analog/digital converter 23 for conversion into a digital signal which is then stored in a memory 24.

A gate signal generator 26 generates a gate signal based on a pitch detected by a pitch detector 25, and a speech section signal generator 27 generates a speech section signal based on the gate signal generated by the gate signal generator 26. Based on the speech section signal generated by the speech section signal generator 27, a word extractor 28 processes the digital signal stored in the memory 24 and extracts and outputs a word contained in the speech section.

In the present embodiment, the analog/digital converter 23, the memory 24, the pitch detector 25, the gate signal generator 26, the speech section signal generator 27, and the word extractor 28 are constructed using, for example, a personal computer, and the pitch detector 25, the gate signal generator 26, the speech section signal generator 27, and the word extractor 28 are implemented in software.

Figure 3:
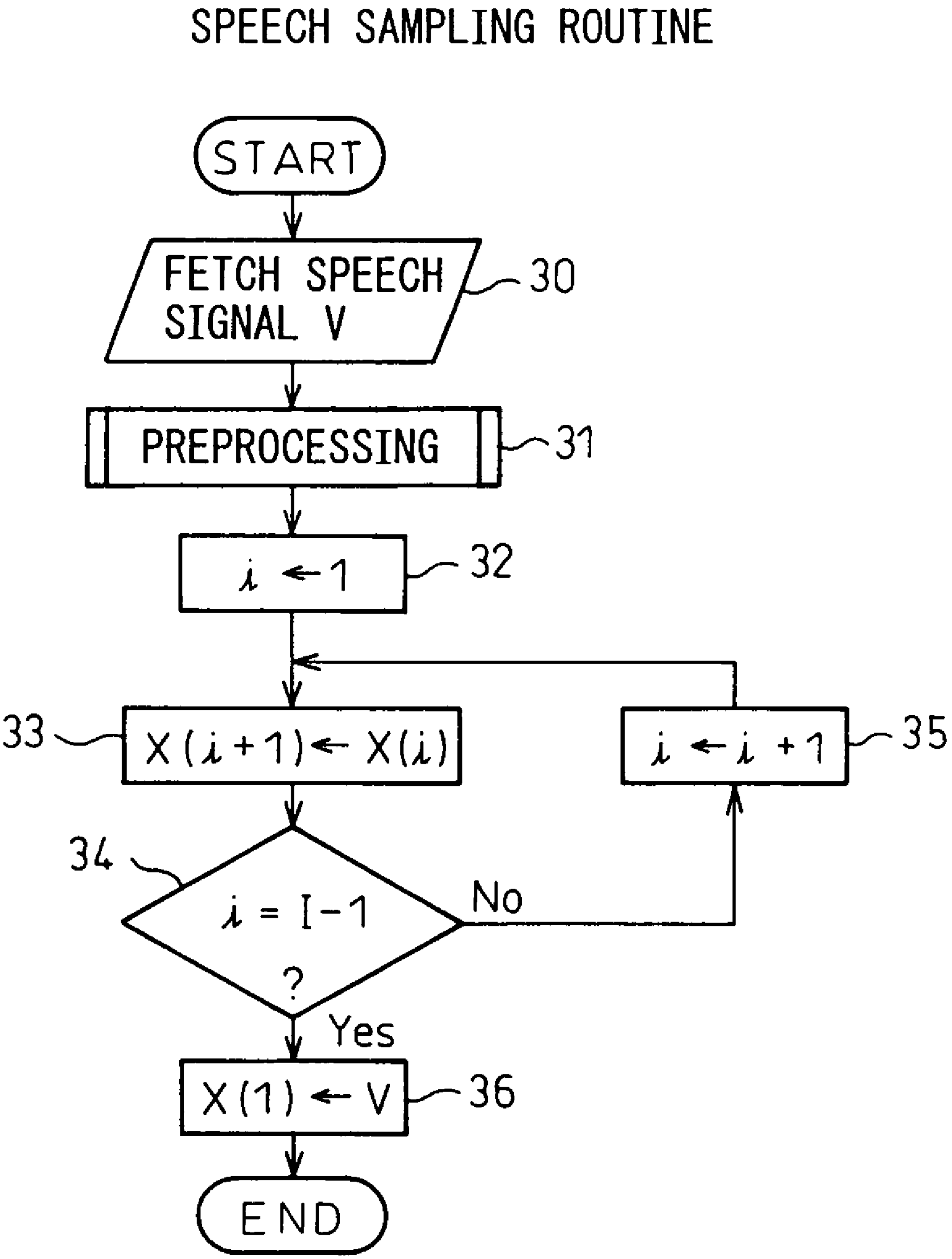
FIG. 3 is a flowchart illustrating a speech sampling routine.

FIG. 3 is a flowchart illustrating a speech sampling routine to be executed in the analog/digital converter 23 and the memory 24. This routine is executed as an interrupt at intervals of every sampling time Δt. First, in step 30, the speech signal V sampled by the analog/digital converter 23 is fetched. Next, in step 31, preprocessing is applied to the speech signal V. The details of the preprocessing will be described later.

In step 32, an index i which indicates the order of storage in the memory 24 is set to "1". Next, in steps 33 to 35, speech signals X(i) already stored in the memory 24 are sequentially shifted by the following processing.

$$X(i+1) \leftarrow X(i)$$

When the shifting is completed, the newly read speech signal V is stored at the starting location X(1) in the memory 24, and the routine is terminated.

Figure 4:
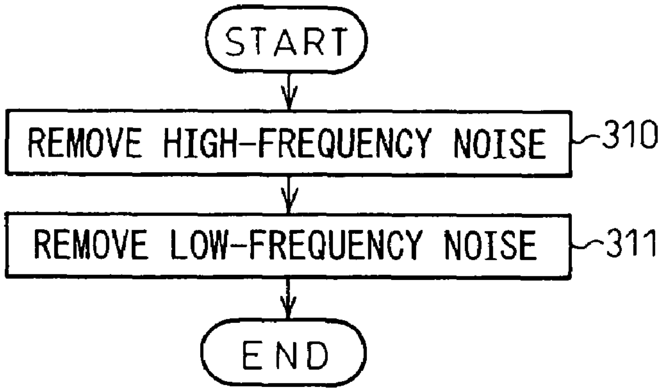
FIG. 4 is a flowchart illustrating a preprocessing routine.

FIG. 4 is a detailed flowchart illustrating the preprocessing routine to be executed in step 31. In step 310, high-frequency noise removal processing is applied to the digital signal. For this processing, use is made, for example, of a low-pass filter having a cutoff frequency of 4 kHz and a cutoff characteristic of 18 dB/oct. In step 311, low-frequency noise removal processing is applied to the digital signal from which the high-frequency noise has been removed. For this processing, use is made, for example, of a high-pass filter having a cutoff frequency of 300 Hz and a cutoff characteristic of 18 dB/oct.

In the above embodiment, the high-frequency noise removal processing and the low-frequency noise removal processing are performed by software, but these may be performed by incorporating a hardware filter in the line amplifier 22.

Figure 5:
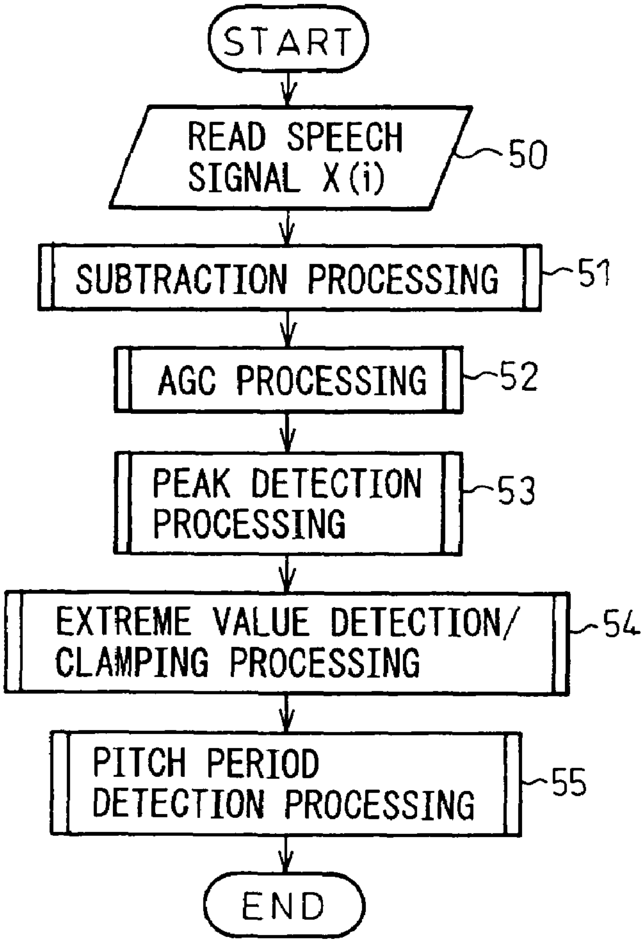
FIG. 5 is a flowchart illustrating a pitch detection routine.

FIG. 5 is a detailed flowchart illustrating a pitch detection routine to be executed in the pitch detector 25. First, in step 50, the speech signal X(i) stored in the memory 24 is read out. Then, subtraction processing is performed in step 51, followed by AGC processing in step 52 and peak detection processing in step 53. Further, extreme value detection/clamping processing is performed in step 54, and pitch period detection processing in step 55, after which the routine is terminated. The processing performed in these steps 51 to 55 will be described in detail below.

Figure 6:
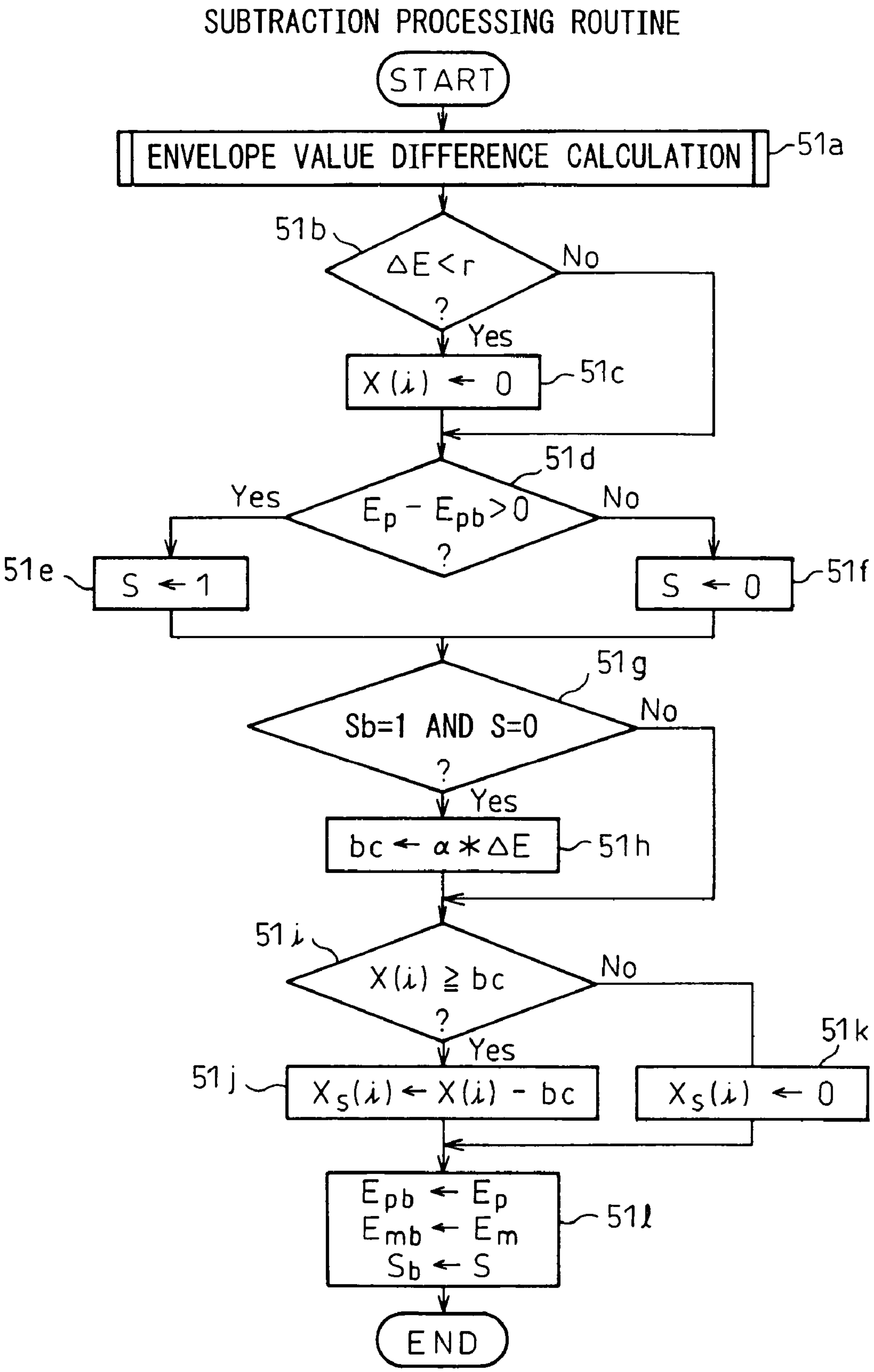
FIG. 6 is a flowchart illustrating a subtraction processing routine.

FIG. 6 is a flowchart illustrating the subtraction processing routine to be executed in step 51 in the pitch detection routine. The purpose of this routine is to remove components smaller than a predetermined amplitude so that noise components of minuscule levels will not be amplified by the AGC in the AGC processing performed to make the amplitude of the speech signal essentially constant. First, in step 51*a*, an envelope value difference ΔE is calculated, the details of which will be described in detail later with reference to FIG. 7.

In step 51*b*, it is determined whether the envelope value difference ΔE is smaller than a predetermined amplitude elimination threshold value r. If the answer is Yes, that is, if the envelope value difference ΔE is smaller than the threshold value r, the speech signal X(i) is set to "0" in step 51*c*, and the process proceeds to step 51*d*. On the other hand, if the answer in step 51*b* is No, that is, if the envelope value difference ΔE is not smaller than the threshold value r, the process proceeds directly to step 51*d*.

In step 51*d*, it is determined whether the present positive envelope value $E_p$ is larger than the previous positive envelope value $E_{pb}$. If the answer in step 51*d* is Yes, that is, if the present positive envelope value $E_p$ is larger than the previous positive envelope value $E_{pb}$ which means that the positive envelope value has increased, then the index S is set to "1" in step 51*e*, and the process proceeds to step 51*g*. On the other hand, if the answer in step 51*d* is No, that is, if the present positive envelope value $E_p$ is smaller than the previous positive envelope value $E_{pb}$ which means that the positive envelope value has decreased, then the index S is set to "0" in step 51*f*, and the process proceeds to step 51*g*.

In step 51*g*, it is detected whether or not the previous value $S_b$ of the index S is "1" and the present index S is "0", that is, whether or not a positive peak is detected. If the answer in step 51*g* is Yes, that is, if the positive peak is detected, the threshold value bc for the subtraction processing is calculated using the following equation in step 51*h*, and thereafter, the process proceeds to step 51*i*.

$$bc \leftarrow \alpha * \Delta E$$

Here, α is a predetermined value, and can be set to a constant value "0.05" when using the speech section detection apparatus of the invention in an automobile. On the other hand, if the answer in step 51*g* is No, that is, if no positive peak is detected, the process proceeds directly to step 51*i*.

In step 51*i*, it is determined whether the speech signal X(i) is either equal to or greater than the subtraction processing threshold value bc, that is, whether the amplitude of the speech signal X(i) is large. If the answer in step 51*i* is Yes, that is, if the amplitude of the speech signal X(i) is equal to or larger that the threshold value bc, then in step 51*j* the value obtained by subtracting the subtraction processing threshold value bc from the speech signal X(i) is set as the subtraction-processed speech signal $X_s(i)$, and the process proceeds to step 51*l*.

$$X_s(i) \leftarrow X(i) - bc$$

On the other hand, if the answer in step 51*i* is No, that is, if the amplitude of the speech signal X(i) is smaller that the threshold value bc, $X_s(i)$ is set to 0 in step 51*k*, and the process proceeds to step 51*l*. Here, the processing in step 51*k* may be omitted, and the process may proceed directly to step 51*l* when the answer in step 51*i* is No.

Finally, in step 51*l*, the previous positive envelope value $E_{pb}$, the previous negative envelope value $E_{mb}$, and the previous index $S_b$ are undated, after which the routine is terminated.

$$E_{pb} \leftarrow E_p$$

$$E_{mb} \leftarrow E_m$$

$$S_b \leftarrow S$$

Figure 7:
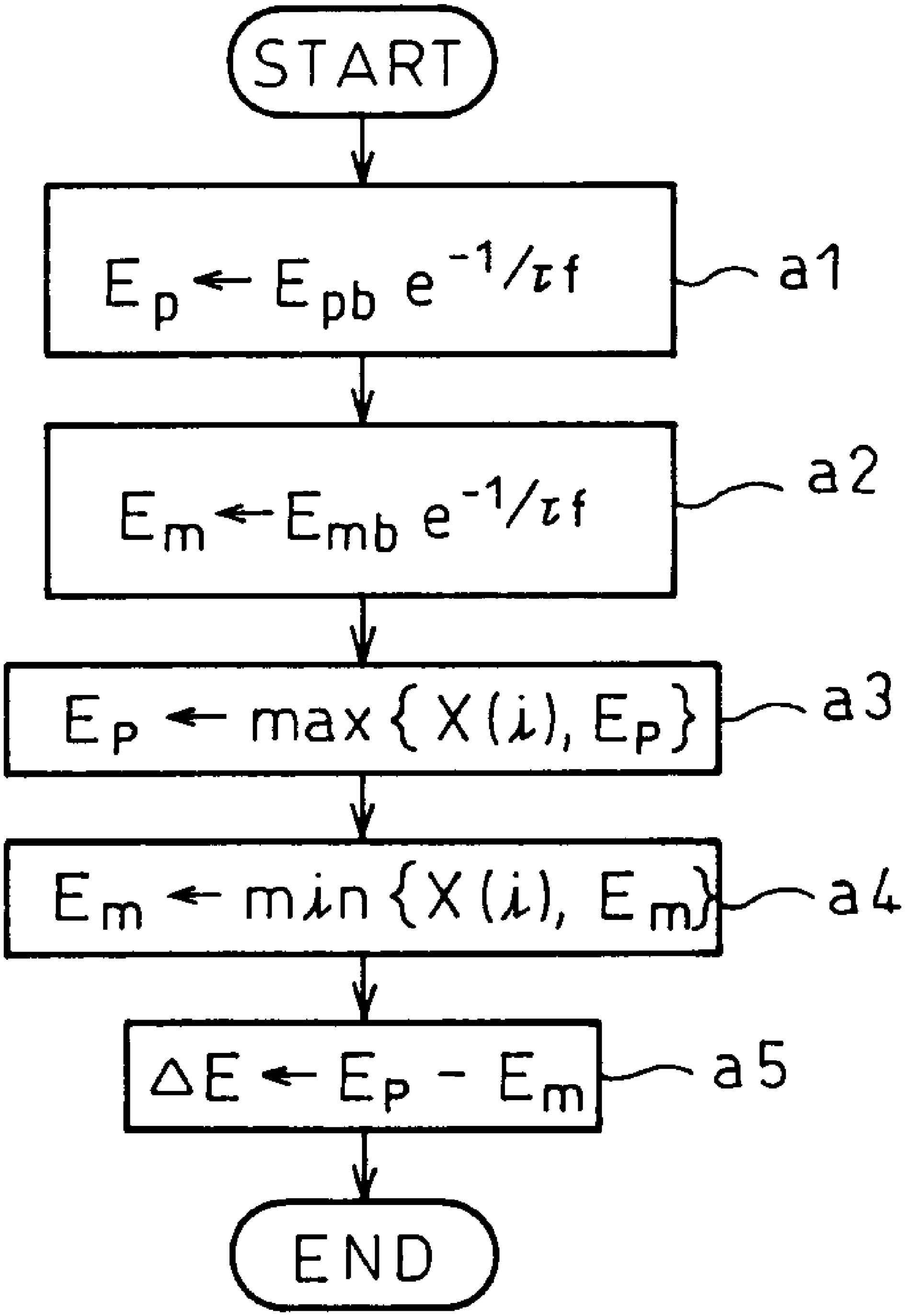
FIG. 7 is a flowchart illustrating an envelope difference calculation routine.

FIG. 7 is a flowchart illustrating the envelope value difference calculation routine to be executed in step 51*a* in the subtraction processing routine. First, in step a1, the present positive envelope value $E_p$ is calculated by the following equation.

$$E_p = E_{pb} \cdot \exp\{-1/(\tau \cdot f_s)\}$$

where τ is a time constant, and $f_s$ is the sampling frequency.

Likewise, in step a2, the present negative envelope value $E_m$ is calculated by the following equation.

$$E_m = E_{mb} \cdot \exp\{-1/(\tau \cdot f_s)\}$$

Next, in step a3, the maximum of the subtraction-processed speech signal $X_s(i)$ and the present positive envelope value $E_p$ calculated in step al is obtained, and the obtained value is taken as the new present positive envelope value $E_p$. Likewise, in step a4, the minimum of the subtraction-processed speech signal $X_s(i)$ and the present negative envelope value $E_m$ calculated in step a2 is obtained, and the obtained value is taken as the new present negative envelope value $E_m$.

In the final step a5, the envelope value difference ΔE is calculated by the following equation, and the routine is terminated.

$$\Delta E = E_p - E_m$$

Figure 8A:
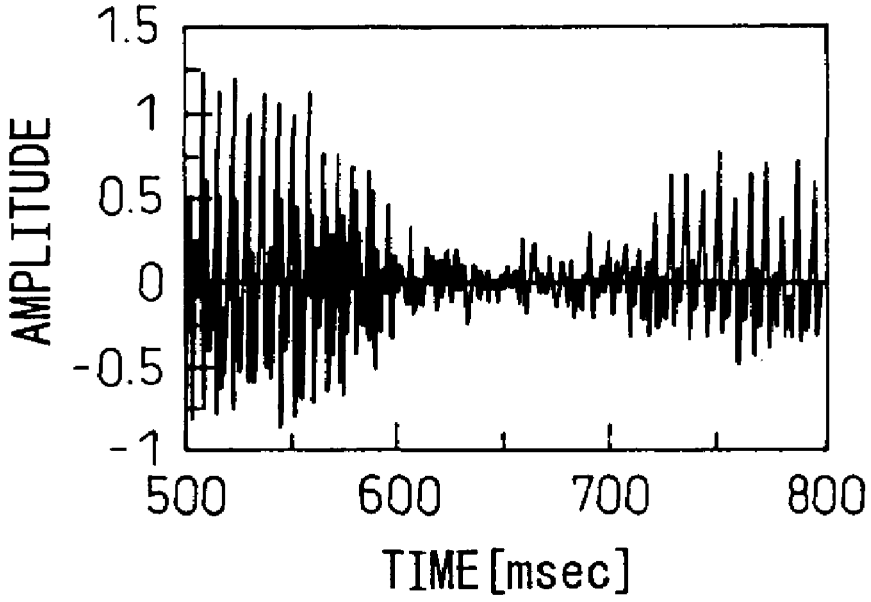
FIGS. 8A and 8B are diagrams for explaining the effectiveness of the subtraction processing.
Figure 8B:
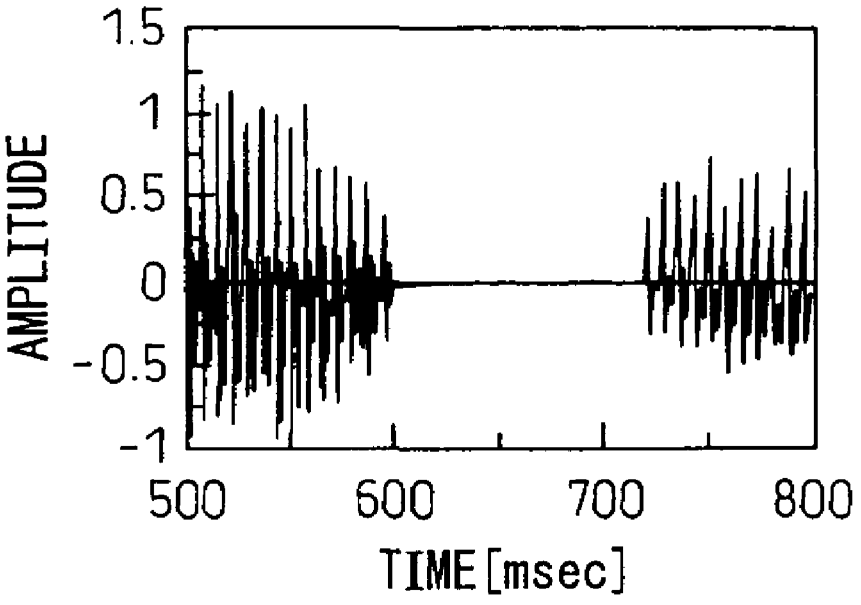

FIGS. 8A and 8B are diagrams for explaining the effectiveness of the subtraction processing: FIG. 8A shows the speech signal before the subtraction processing, and FIG. 8B shows the speech signal after the subtraction processing. From these figures, it can be seen that low noise has been removed by the subtraction processing.

Figure 9:
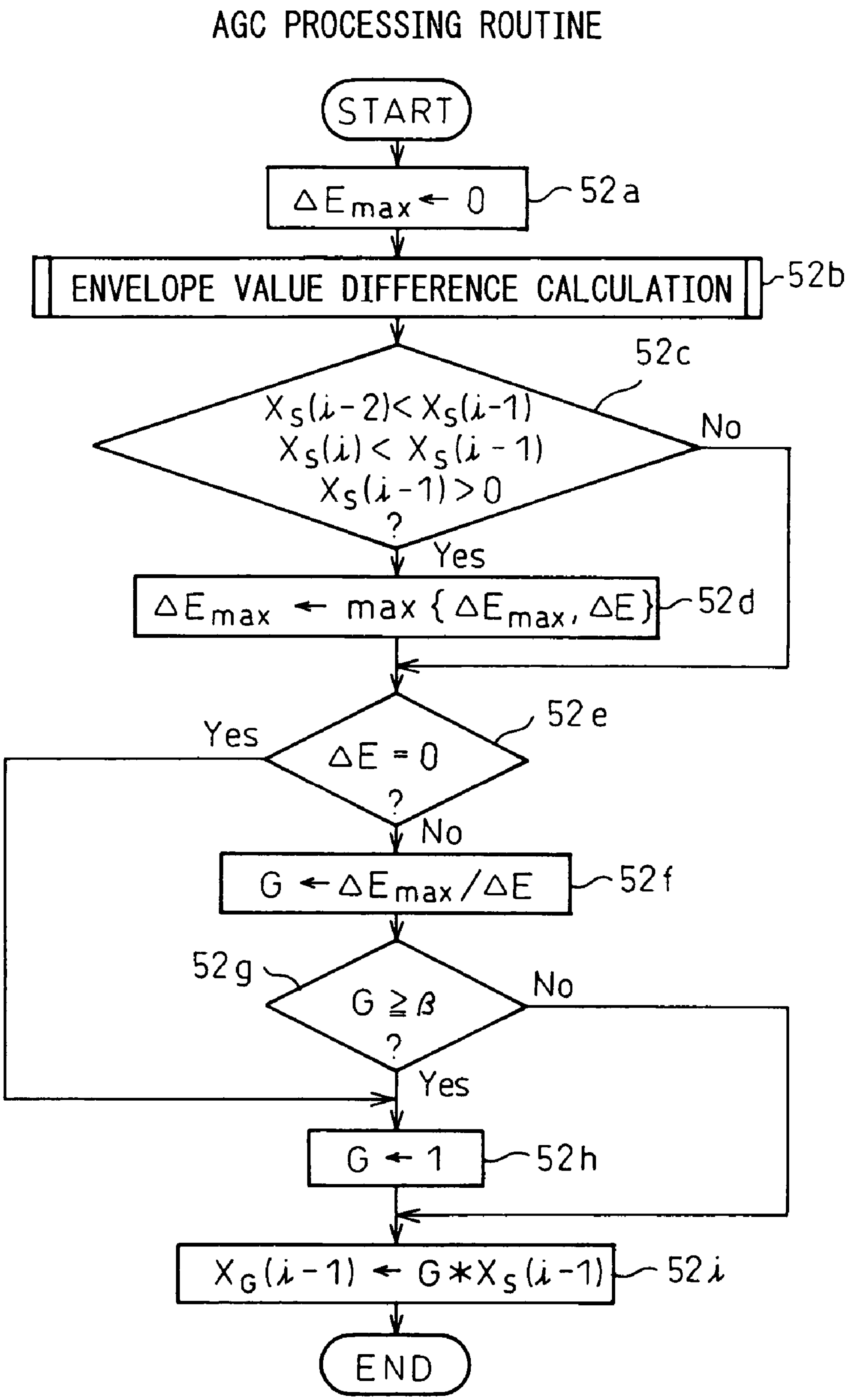
FIG. 9 is a flowchart illustrating an AGC processing routine.

FIG. 9 is a flowchart illustrating the AGC processing routine to be executed in step 52 in the pitch detection routine. The purpose of this routine is to make the amplitude of the subtraction-processed speech signal $X_s(i)$ essentially constant. First, in step 52*a*, maximum envelope value difference $\Delta E_{max}$ is initialized to 0, and in step 52*b*, the envelope value difference calculation routine shown in FIG. 7 is executed to calculate the envelope value difference ΔE. In this case, however, it will be recognized that X(i) in steps a3 and a4 in the envelope value difference calculation routine is replaced by $X_s(i)$.

Next, in step 52*c*, it is determined whether the conditions $$X_s(i-2) < X_s(i-1)$$

$$X_s(i) < X_s(i-1) \text{ and}$$

$$X_s(i-1) > 0$$

are satisfied, that is, whether the subtraction-processed speech signal $X_s(i-1)$ sampled Δt before is a positive peak.

If the answer in step 52*c* is Yes, that is, if the subtraction-processed speech signal $X_s(i-1)$ is the positive peak, then in step 52*d* the maximum of the envelope value difference ΔE and the previously determined maximum envelope value difference $\Delta E_{max}$ is taken as the new maximum envelope value difference $\Delta E_{max}$ to update the maximum envelope value difference $\Delta E_{max}$, and the process proceeds to step 52*e*. On the other hand, if the answer in step 52*c* is No, that is, if the speech signal $X_s(i-1)$ is not a positive peak, the process proceeds directly to step 52*e*.

In step 52*e*, it is determined whether the envelope value difference ΔE calculated in step 52*b* is "0". If the answer is No, that is, if ΔE is "0", gain G is set to $\Delta E_{max}/\Delta E$ in step 52*f*. Next, in step 52*g*, it is determined whether the gain G is either equal to or larger than a predetermined threshold value β (for example, 10); if the answer is Yes, the gain G is set to "1" in step 52*h*, and the process proceeds to step 52*i*. Here, the decision in step 52*g* may be omitted, and the process may proceed directly from step 52*f* to step 52*i*.

On the other hand, if the answer in step 52*g* is No, that is, if the gain G is smaller than the predetermined threshold value β, the process proceeds directly to step 52*i*. In the earlier step 52*e*, if the answer is Yes, that is, if ΔE is "0", then the process proceeds to step 52*h* where the gain G is set to "1", after which the process proceeds to step 52*i*.

Finally, in step 52*i*, the AGC-processed speech signal $X_G(i-1)$ is calculated by multiplying the subtraction-processed speech signal $X_s(i-1)$ by the gain G, and the routine is terminated.

$$X_G(i-1) \leftarrow G^* X_s(i-1)$$

Figure 10A:
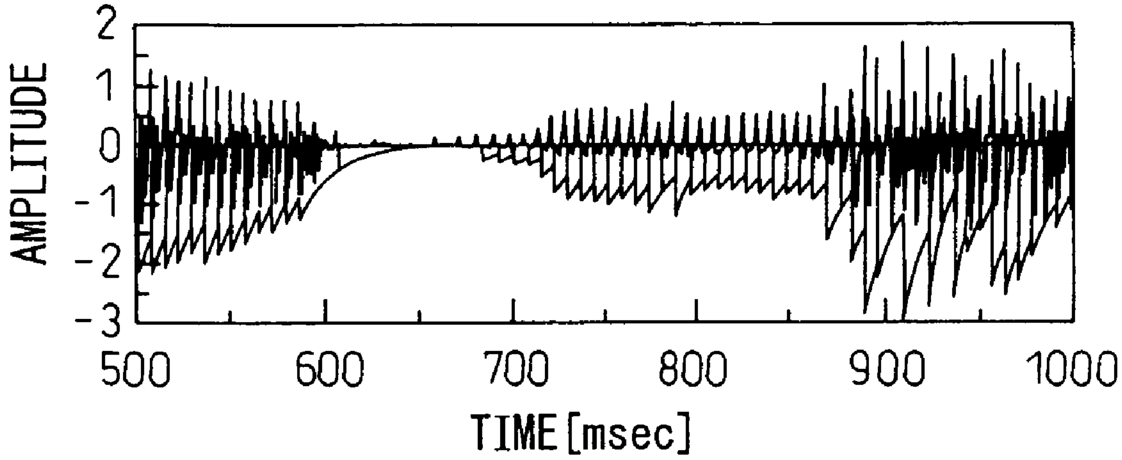
FIGS. 10A and 10B are diagrams for explaining the effectiveness of the AGC processing.
Figure 10B:
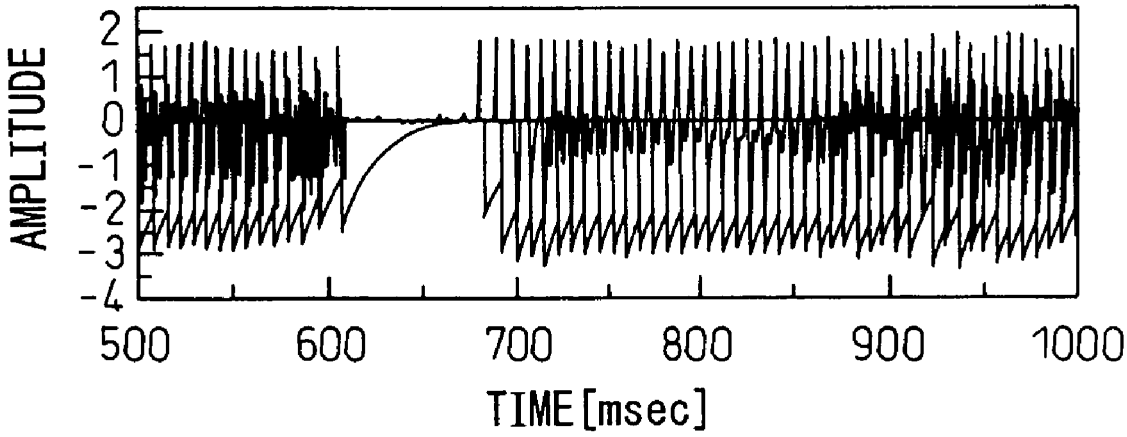

FIGS. 10A and 10B are diagrams for explaining the effectiveness of the AGC processing: FIG. 10A shows the speech signal before the AGC processing, and FIG. 10B shows the speech signal after the AGC processing. That is, when the amplitude of the speech waveform abruptly changes as shown in FIG. 10A, occurrence of an erroneous detection is unavoidable in the pitch period detection described hereinafter. In the AGC processing, the amplitude of the speech waveform is made essentially constant in order to prevent the occurrence of an erroneous detection.

Figure 11:
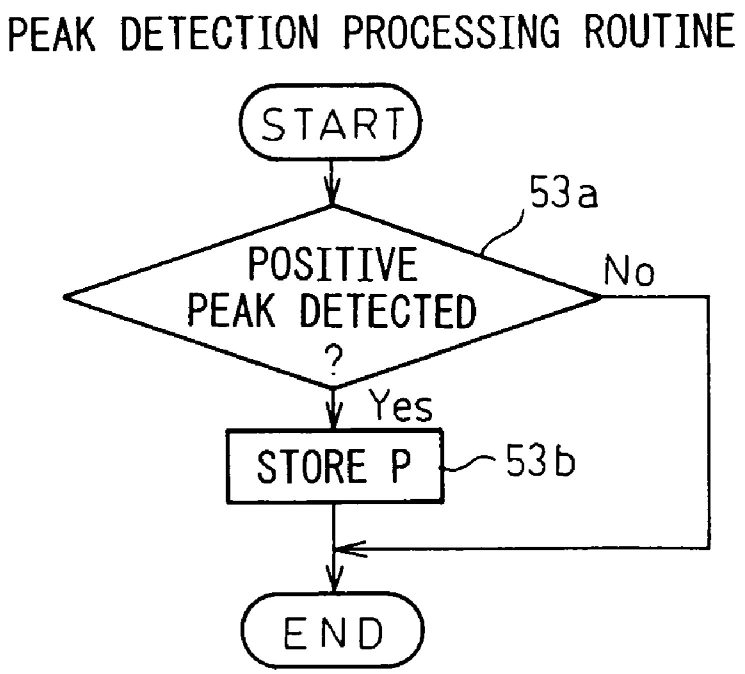
FIG. 11 is a flowchart illustrating a peak detection processing routine.

FIG. 11 is a detailed flowchart illustrating the peak detection processing routine to be executed in step 53 in the pitch detection routine. First, in step 53*a*, it is determined whether a positive peak is detected in the AGC-processed speech signal. That is, when the following conditions are satisfied, it is determined that $X_G(i-2)$ is the positive peak.

$$X_G(i-3) < X_G(i-2)$$

$$X_G(i-1) < X_G(i-2) \text{ and}$$

$$0 < X_G(i-2)$$

If the answer in step 53*a* is Yes, that is, if the positive peak is detected in the AGC-processed speech signal, the peak value $X_G(i-2)$ is stored as P in step 53*b*, and the routine is terminated. If the answer in step 53*a* is No, that is, if no positive peak is detected in the AGC-processed speech signal, the routine is terminated.

Figure 12:
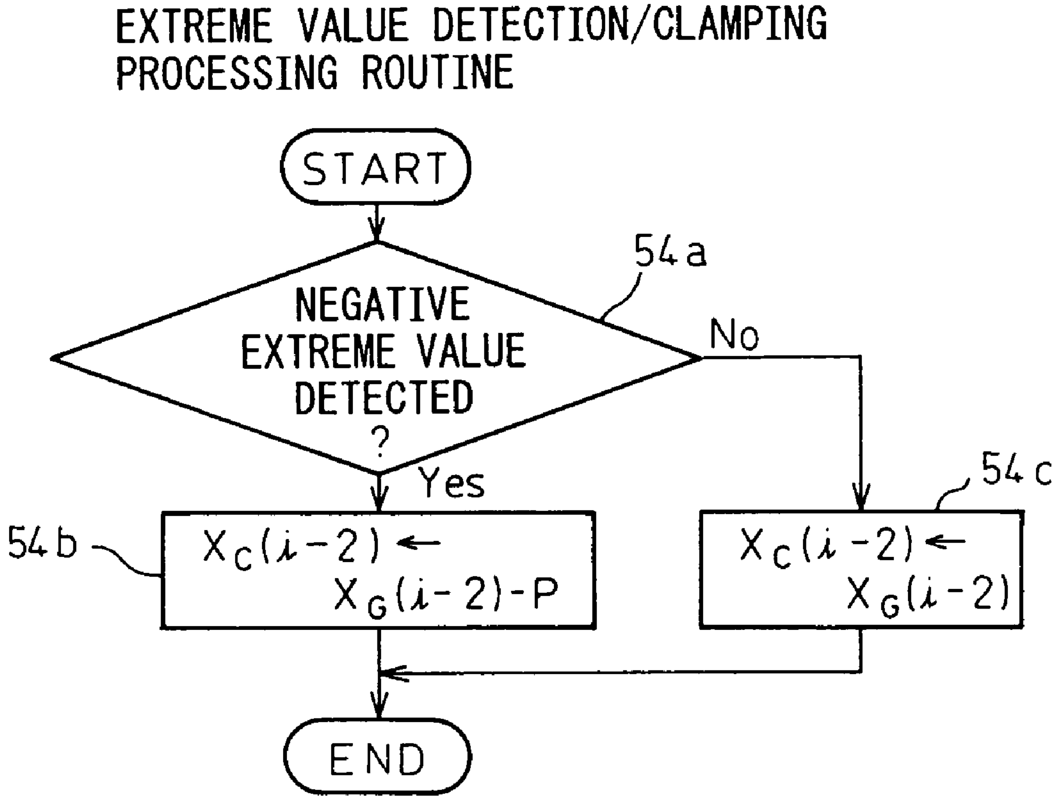
FIG. 12 is a flowchart illustrating an extreme value detection/clamping processing routine.

FIG. 12 is a detailed flowchart illustrating the extreme value detection/clamping processing routine to be executed in step 54 in the pitch detection routine. First, in step 54*a*, it is determined whether a negative peak is detected in the AGC-processed speech signal. That is, when the following conditions are satisfied, it is determined that $X_G(i-2)$ is the negative peak.

$$X_G(i-3) > X_G(i-2)$$

$$X_G(i-1) > X_G(i-2) \text{ and}$$

$$0 > X_G(i-2)$$

If the answer in step 54*a* is Yes, that is, if the negative peak is detected in the AGC-processed speech signal, the clamping-processed speech signal $X_C(i-2)$ with its negative peak emphasized is calculate in step 54*b* by subtracting the peak value P from the AGC-processed speech signal $X_G(i-2)$, and the routine is terminated.

$$X_C(i-2) \leftarrow X_G(i-2) - P$$

If the answer in step 54*a* is No, that is, if no negative peak is detected in the AGC-processed speech signal, the AGC-processed speech signal $X_G(i-2)$ is taken as the clamping-processed speech signal $X_C(i-2)$, and the routine is terminated.

$$X_C(i-2) \leftarrow X_G(i-2)$$

Figure 13:
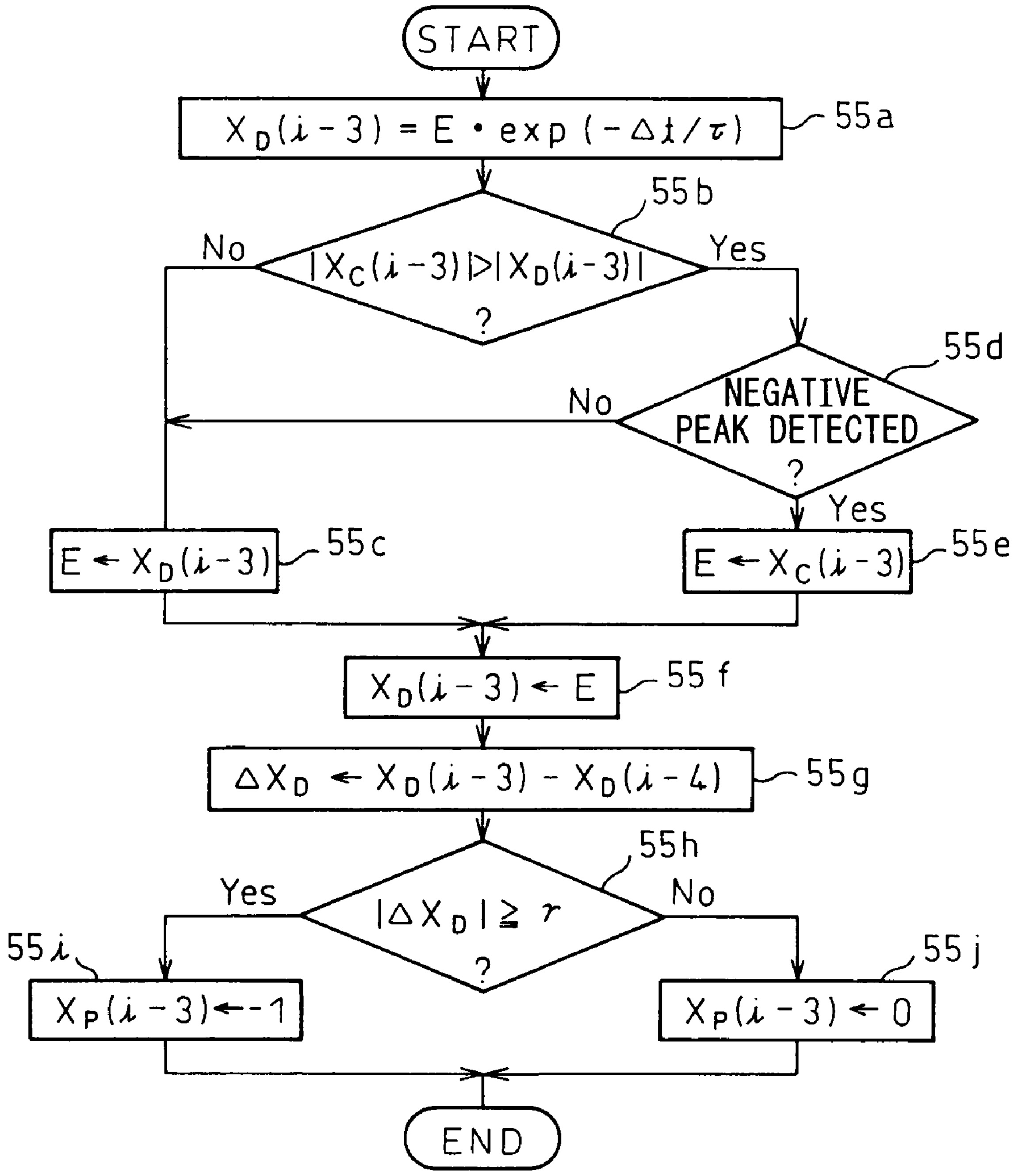
FIG. 13 is a flowchart illustrating a pitch period detection processing routine.

FIG. 13 is a detailed flowchart illustrating the pitch period detection processing routine to be executed in step 55 in the pitch detection routine. First, in step 55*a*, the detected output $X_D(i-3)$ is calculated by the following equation.

$$X_D(i-3) \leftarrow E \cdot \exp\{-\Delta t/(\tau)\}$$

where Δt is the sampling time, and τ is a predetermined time constant. E will be described later.

In step 55*b*, it is determined whether the absolute value of the clamping-processed speech signal $X_C(i-3)$ is greater than the absolute value of the detected output $X_D(i-3)$. If the answer in step 55*b* is No, that is, if the absolute value of $X_C(i-3)$ is not greater than the absolute value of $X_D(i-3)$, the detected output $X_D(i-3)$ is set as E in step 55*c*, and the process proceeds to step 55*f*.

If the answer in step 55*b* is Yes, that is, if the absolute value of $X_C(i-3)$ is greater than the absolute value of $X_D(i-3)$, then it is determined in step 55*d* whether there is a negative peak in the clamping-processed speech signal. That is, when the following conditions are satisfied, it is determined that $X_C(i-3)$ is the negative peak.

$$X_C(i-4) > X_C(i-3)$$

$$X_C(i-2) > X_C(i-3) \text{ and}$$

$$0 > X_C(i-3)$$

If the answer in step 55*d* is Yes, that is, if the negative peak is detected in the clamping-processed speech signal, the negative peak value $X_C(i-3)$ is set as E in step 55*e*, and the process proceeds to step 55*f*. On the other hand, if the answer in step 55*d* is No, that is, if no negative peak is detected in the clamping-processed speech signal, the process proceeds to the step 55*c* described above.

In step 55*f*, the value stored as E is set as the detected signal $X_D(i-3)$, and in the next step 55*g*, the detected-signal change $\Delta X_D$ is calculated by the following equation.

$$\Delta X_D \leftarrow X_D(i-3) - X_D(i-4)$$

In step 55*h*, it is determined whether the absolute value of the detected-signal change $\Delta X_D$ is either equal to or greater than a predetermined threshold value γ. If the answer in step 55*h* is Yes, that is, if the detected output has decreased greatly, then the speech pitch signal $X_P(i-3)$ is set to "−1" in step 55*i*, and the routine is terminated. On the other hand, if the answer in step 55*h* is No, that is, if the detected output has not decreased greatly, then the speech pitch signal $X_P(i-3)$ is set to "0" in step 55*j*, and the routine is terminated.

Figure 14A:
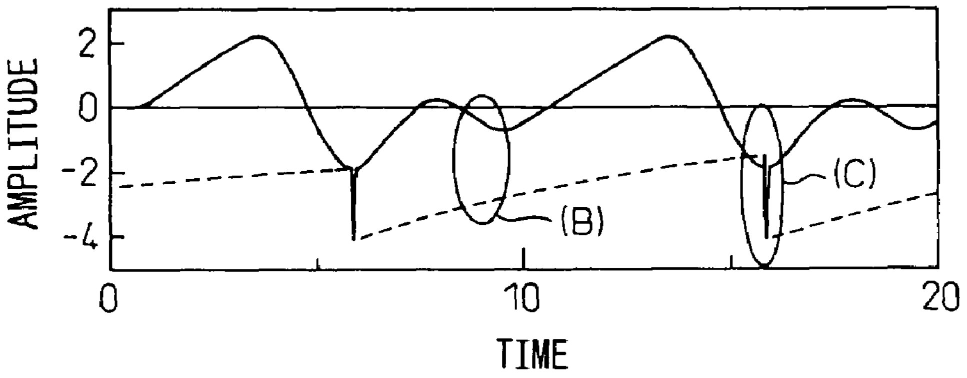
FIGS. 14A, 14B, and 14C are diagrams (½) for explaining a pitch period detection method.
Figure 14B:
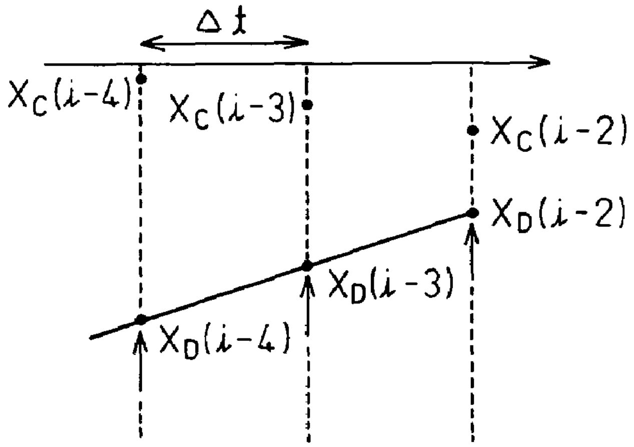
Figure 14C:
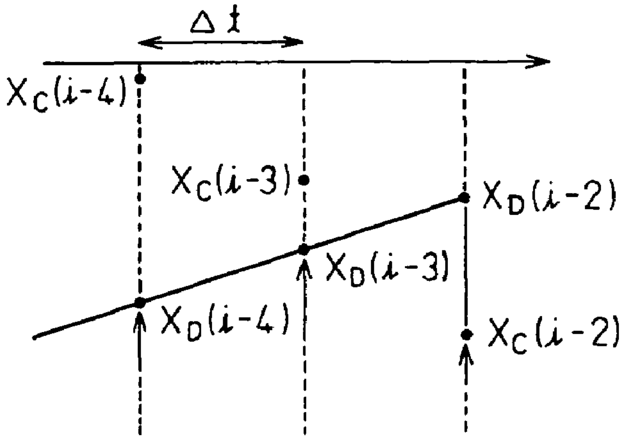
Figure 15A:
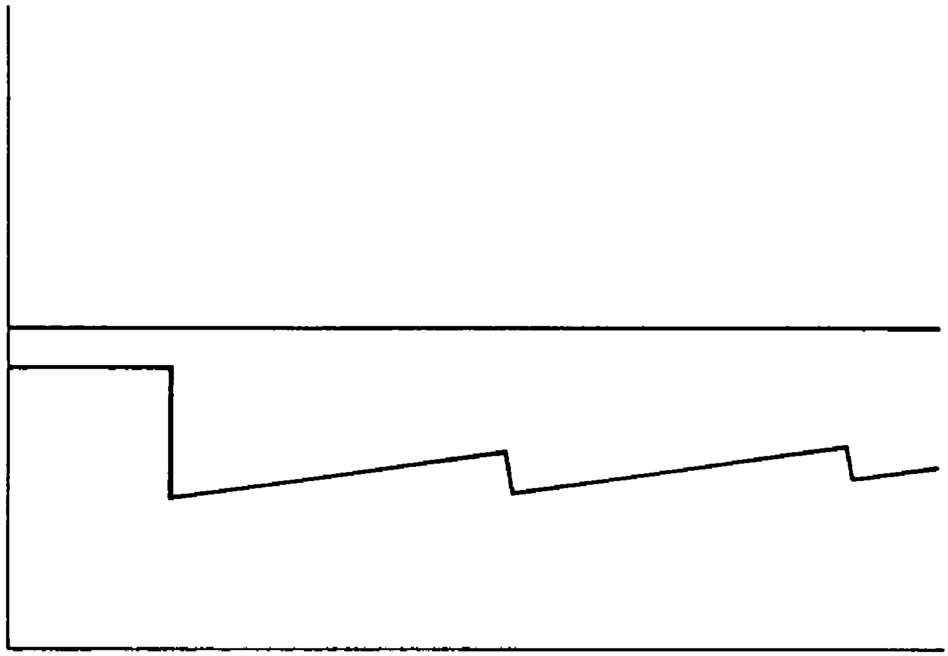
FIGS. 15A and 15B are diagrams (2/2) for explaining the pitch period detection method.
Figure 15B:
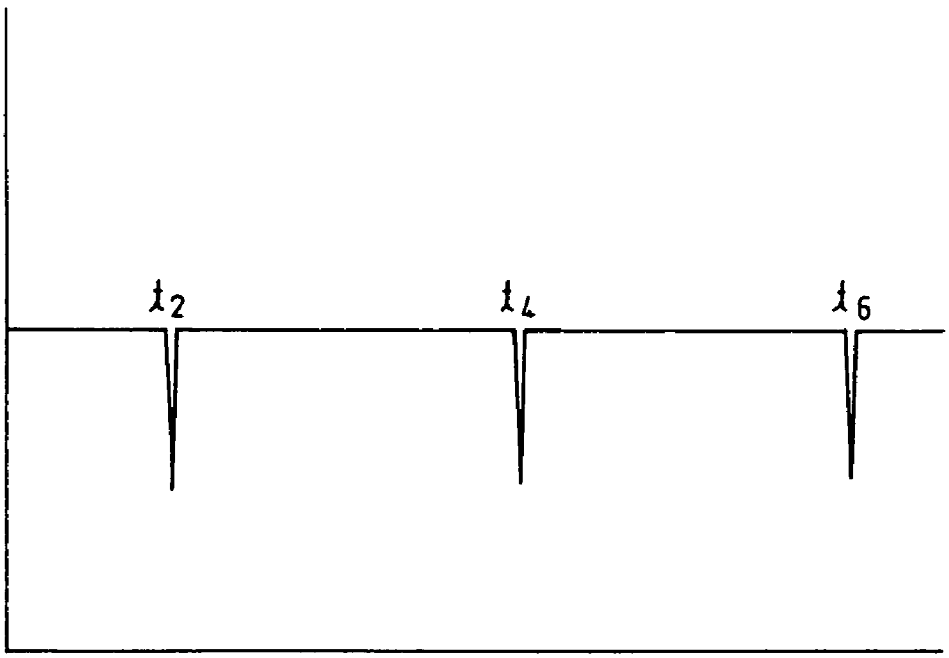

FIGS. 14A, 14B, and 14C and FIGS. 15A and 15B are diagrams for explaining the pitch period detection method applied in the present invention. FIG. 14A shows the clamping-processed speech signal, and FIGS. 14B and 14C each show a portion of the speech signal in enlarged form; here, the time is plotted along the abscissa, and the amplitude along the ordinate. More specifically, when the clamping-processed speech signal is inside the envelope whose starting point is a negative peak ((B) in FIG. 14A, and FIG. 14B), the envelope is maintained; on the other hand, when it is outside the envelope ((C) in FIG. 14A, and FIG. 14C), the clamping-processed speech signal is taken as the detected output. FIGS. 15A and 15B are diagrams showing the detected signal and the speech pitch signal, respectively; as shown, pitch pulses are detected at times $t_2$, $t_4$, and $t_6$, respectively.

Figure 16:
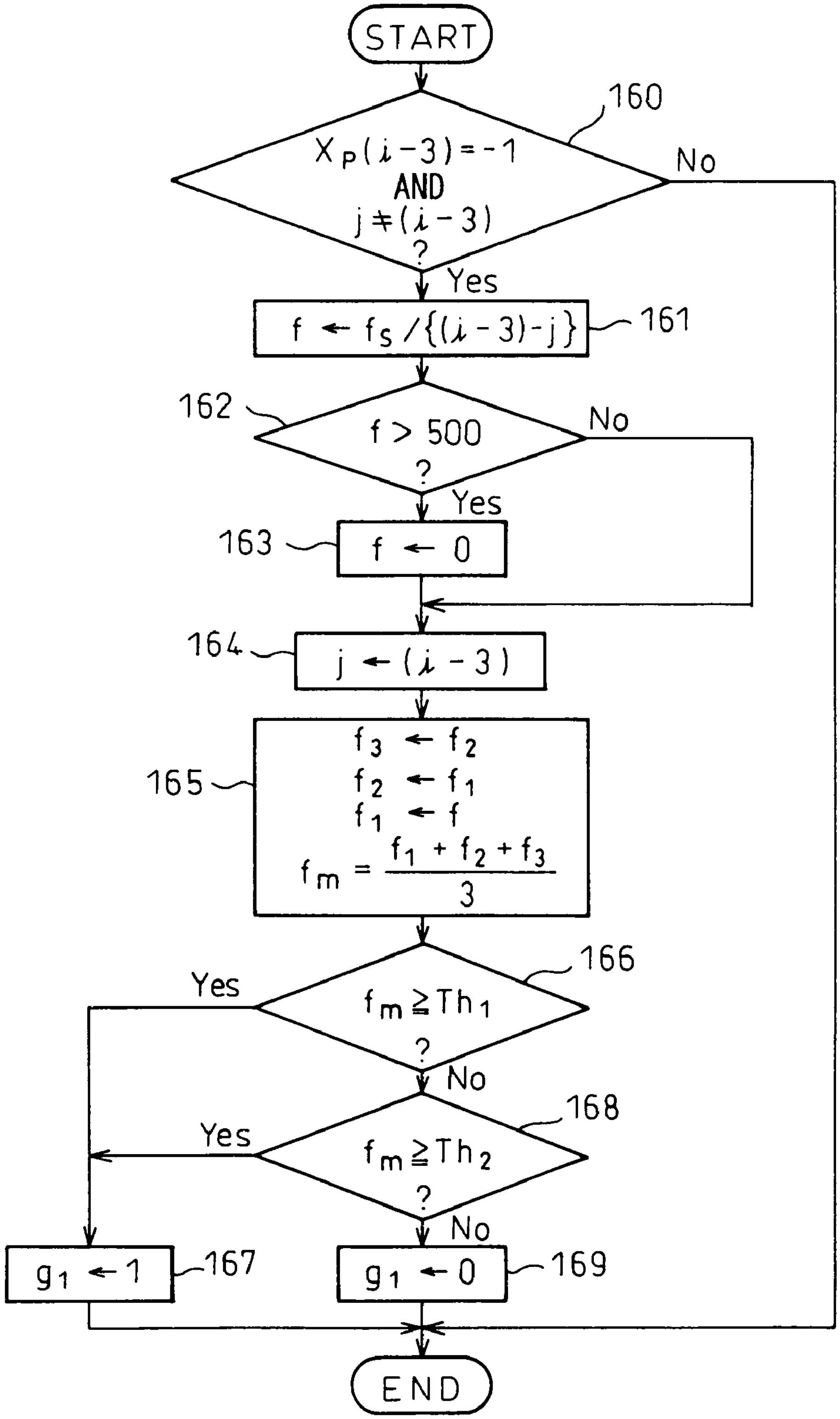
FIG. 16 is a flowchart illustrating a first gate signal generation routine.

FIG. 16 is a flowchart illustrating a first gate signal generation routine to be executed in the gate signal generator 26. First, in step 160, it is determined whether the speech pitch signal $X_P(i-3)$ is "−1" and the index j indicating the last time at which the speech pitch signal was "−1" is unequal to (i−3). If the answer in step 160 is No, that is, if the speech pitch signal $X_P(i-3)$ is not "−1", or if j is equal to (i−3), then the routine is terminated immediately.

If the answer in step 160 is Yes, that is, if the speech pitch signal $X_P(i-3)$ is "−1", and if the index j is unequal to (i−3), then the process proceeds to step 161 to calculate the pitch frequency f by the following equation.

$$f(i-3)=f_s/\{(i-3)-j\}$$

Here, $f_s$ is the sampling frequency which is equal to $1/\Delta t$.

In step 162, it is determined whether the pitch frequency f is higher than a maximum frequency 500 Hz; if it is higher than the maximum frequency, the pitch frequency f is set to "0" in step 163, and the process proceeds to step 164. On the other hand, if the answer in step 162 is No, the process proceeds directly to step 164. In step 164, the index j indicating the last time at which the speech pitch signal was "−1" is updated to (i−3).

Next, in step 165, after updating the pitch frequency as shown below, an average pitch frequency $f_m$ is calculated. In the present embodiment, the average pitch frequency is calculated by taking the arithmetic mean of three pitch frequencies, but the number of pitch frequencies used is not limited to three. Further, the calculation method for the average pitch frequency is not limited to taking the arithmetic mean, but other methods, such as a weighted average or moving average, may be used to calculate the average.

$$f_3 \leftarrow f_2$$

$$f_2 \leftarrow f_1$$

$$f_1 \leftarrow f(i-3)$$

$$f_m=(f_3+f_2+f_1)/3$$

Then, in step 166, it is determined whether the average pitch frequency $f_m$ is either equal to or higher than a predetermined first threshold $Th_1$ (for example, 200 Hz). If the answer in step 166 is Yes, that is, if the average pitch frequency $f_m$ is either equal to or higher than the first threshold $Th_1$, it is determined that a speech section has begun here, and the gate signal $g_1$ is set to "1" in step 167, after which the routine is terminated.

On the other hand, if the answer in step 166 is No, that is, if the average pitch frequency $f_m$ is lower than the first threshold $Th_1$, then it is determined in step 168 whether the average pitch frequency $f_m$ is either equal to or higher than a predetermined second threshold $Th_2$ (for example, 80 Hz). If the answer in step 168 is Yes, that is, if the average pitch frequency $f_m$ is either equal to or higher than the second threshold $Th_2$, it is determined that the speech section is continuing, and the process proceeds to step 167 to maintain the gate signal $g_1$ at "1", after which the routine is terminated.

On the other hand, if the answer in step 168 is No, that is, if the average pitch frequency $f_m$ is lower than the second threshold $Th_2$, it is determined that the speech section has ended, and the process proceeds to step 169 to reset the gate signal $g_1$ to "0", after which the routine is terminated.

Figure 17A:
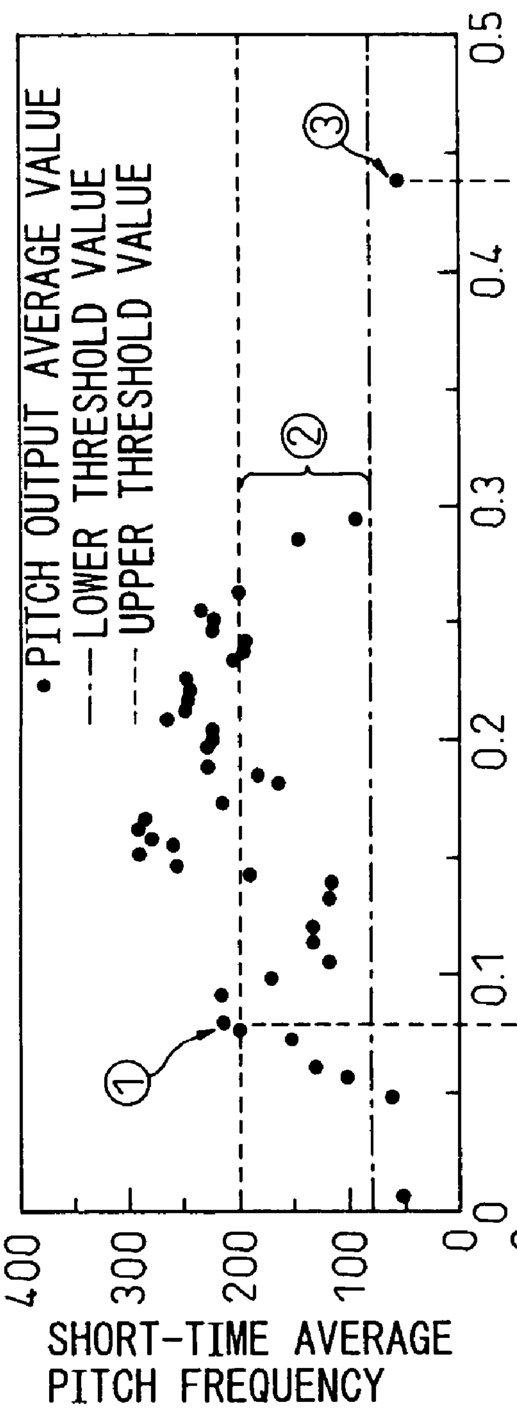
FIGS. 17A and 17B are diagrams for explaining the method of gate signal generation.
Figure 17B:
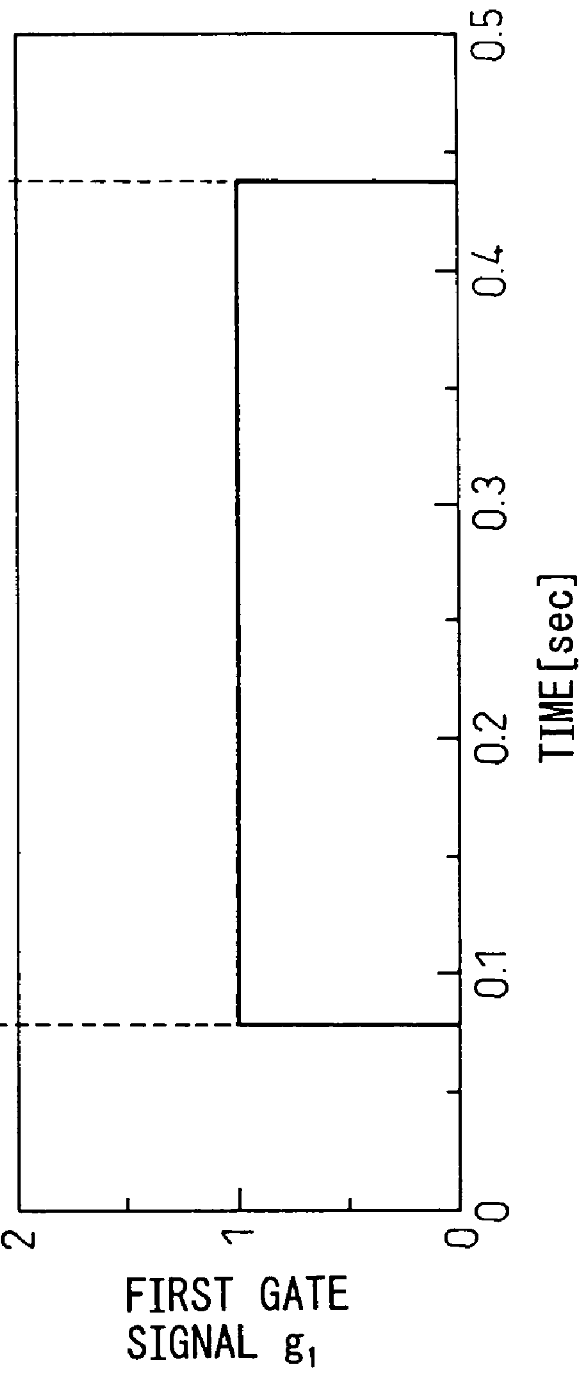

FIGS. 17A and 17B are diagrams for explaining the method of gate signal generation: FIG. 17A shows the pitch frequency, and FIG. 17B shows the gate signal $g_1$. In FIG. 17A, filled circles indicate the average pitch frequencies $f_m$ at various times. When the average pitch frequency taken over three consecutive pitch frequencies becomes equal to or higher than the first threshold $Th_1$ (200 Hz), the gate signal $g_1$ is set to "1", that is, opened. As long as the average pitch frequency does not become lower than the second threshold $Th_2$ (80 Hz), the gate signal $g_1$ remains open, and when the average pitch frequency drops below the second threshold $Th_2$ (80 Hz), the gate signal $g_1$ is set to "0", that is, closed.

Figure 18A:
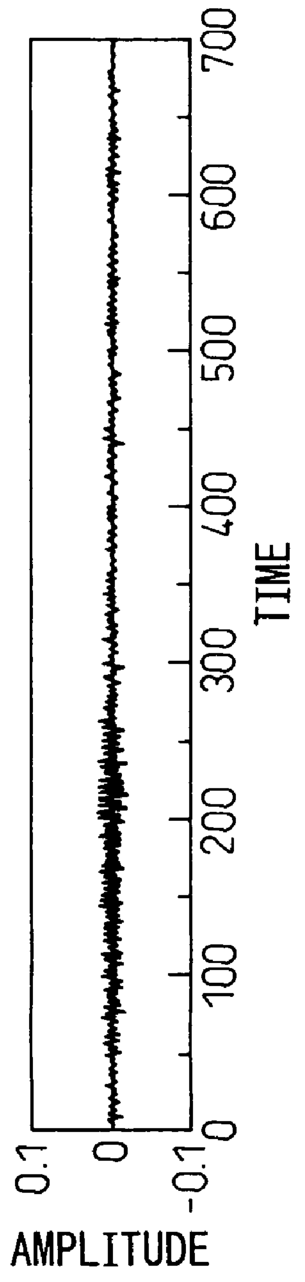
FIGS. 18A, 18B, 18C, 18D, 18E, and 18F are diagrams showing speech signal processing examples.
Figure 18B:
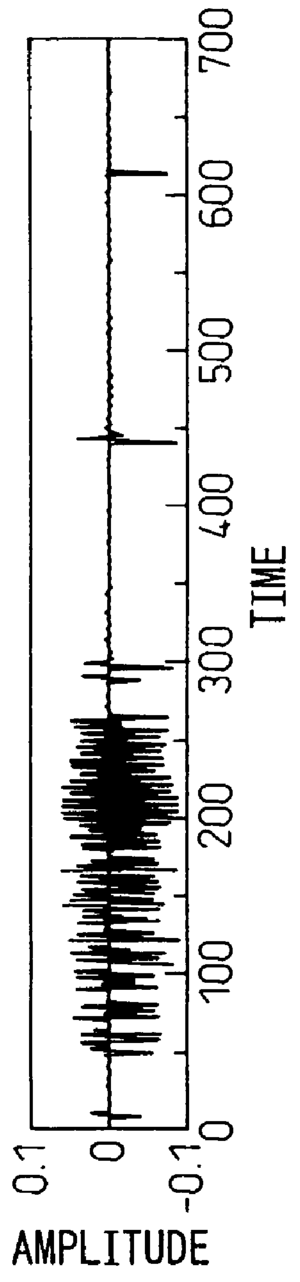
Figure 18C:
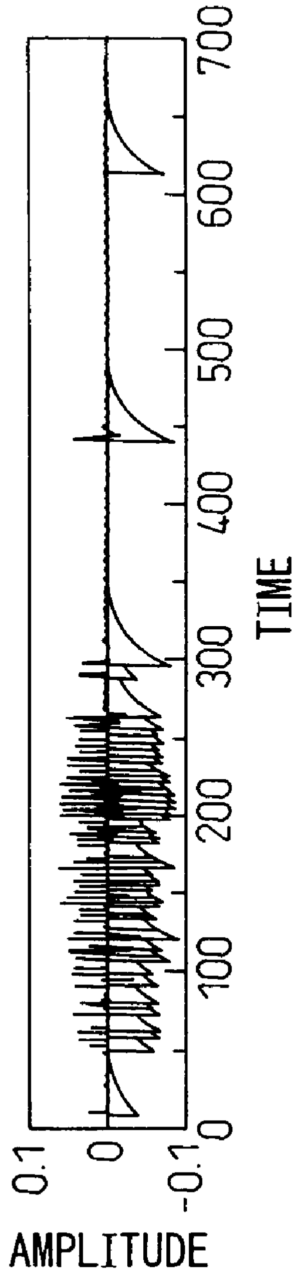
Figure 18D:
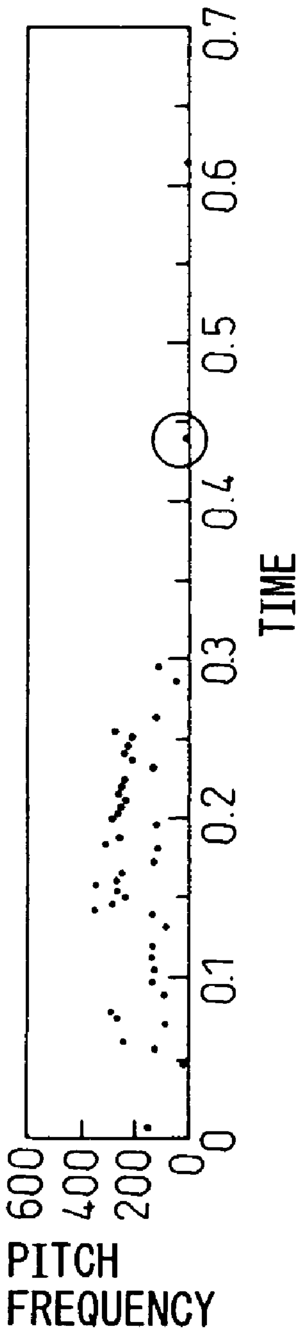
Figure 18E:
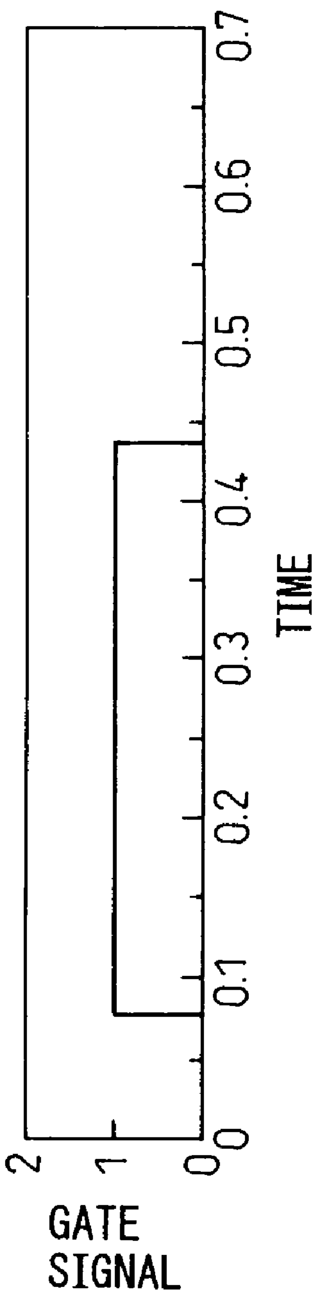

FIGS. 18A, 18B, 18C, 18D, 18E, and 18F are diagrams showing speech signal processing examples; here, FIG. 18A is a diagram showing the speech signal X obtained by removing low-frequency noise from the target speech signal V in the preprocessing routine by using a high-pass filter having a cutoff frequency of 300 Hz. FIG. 18B shows the waveform of the speech signal $X_G$ after the AGC processing in the AGC processing routine; as shown, components larger than a prescribed amplitude are shaped so as to hold the amplitude essentially constant. FIG. 18C shows the signal $X_D$ after the detection processing in the pitch period detection processing routine, and FIG. 18D shows the pitch frequency f calculated in step 341 in the first gate signal generation routine. Further, FIG. 18E shows the gate signal $g_1$ generated in the first gate signal generation routine.

As can be seen from these figures, the duration period of the speech signal coincides with the period that the gate signal $g_1$ remains open, but if noise occurs after the voice stops, a noise-induced pitch frequency (marked by ○ in FIG. 18D) occurs, causing a delay in the closing timing of the gate signal $g_1$.

Figure 19:
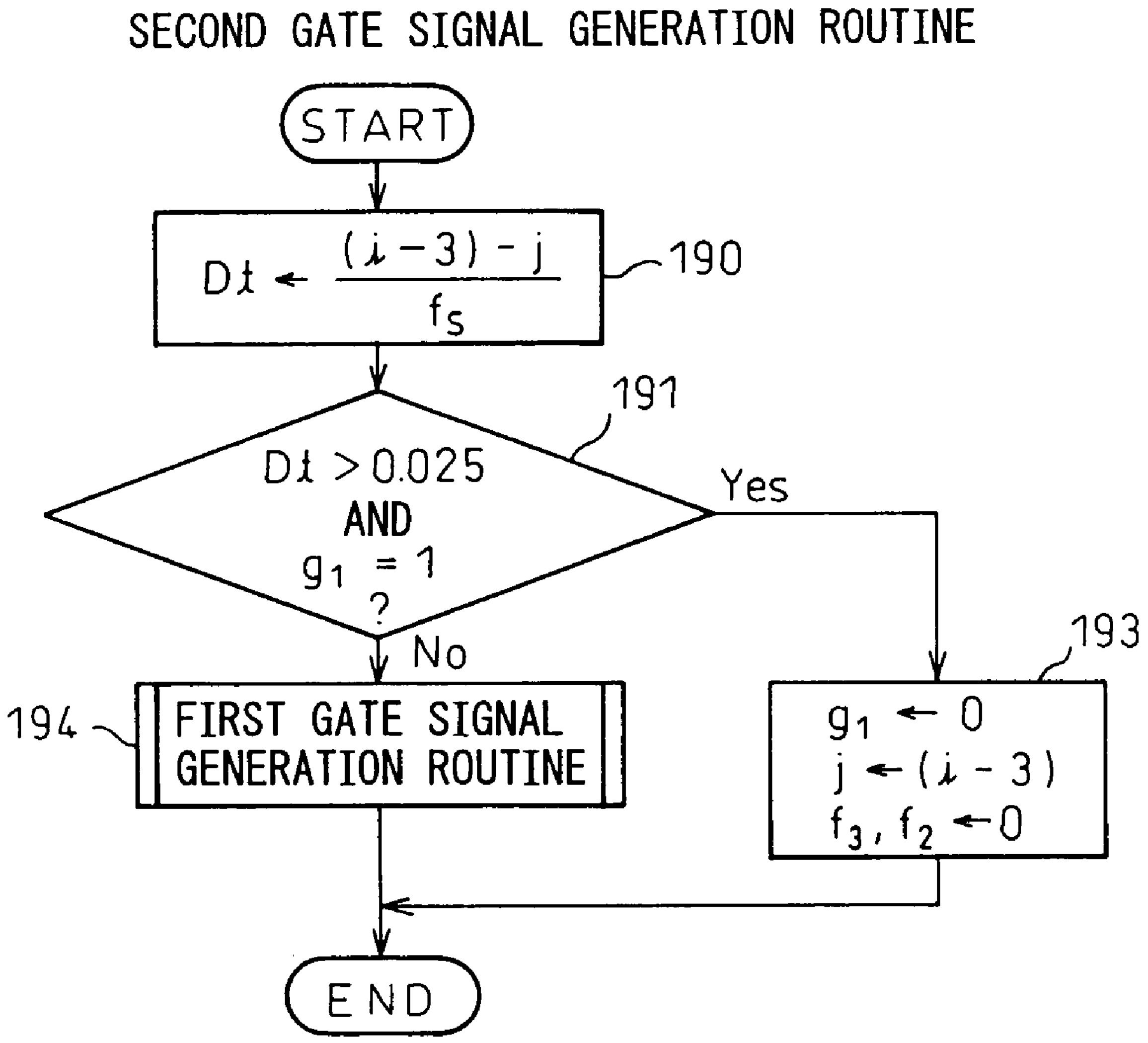
FIG. 19 is a flowchart illustrating a second gate signal generation routine.

FIG. 19 is a flowchart illustrating a second gate signal generation routine. The purpose of this routine is to solve the above problem by adding steps 190, 191, and 193 to the first gate signal generation routine. More specifically, in step 190, the elapsed time Dt from the index j indicating the last time at which the speech pitch signal $X_P(i-3)$ was "−1" to (i−3) is calculated by the following equation.

$$Dt \leftarrow \{(i-3)-j\}/f_s$$

Next, in step 191, it is determined whether the elapsed time Dt is longer than a predetermined threshold time $Dt_{th}$ (for example, 0.025 second) and whether the gate signal $g_1$ is "1" (that is, the gate is open). If the answer in step 191 is Yes, that is, if the gate is open, and if a time longer than 25 milliseconds has elapsed from the last time at which the speech pitch signal was "−1", then in step 193 the corrected gate signal $g_1$ is set to "0" to close the gate and, at the same time, the index j is updated and $f_2$ and $f_3$ are reset, after which the routine is terminated.

On the other hand, if the answer in step 191 is No, that is, if the gate is closed, or if a time longer than 25 milliseconds has not yet elapsed from the last time at which the speech pitch signal was "−1", then the first gate signal generation routine shown in FIG. 16 is executed in step 194, after which the routine shown here is terminated.

Figure 18F:
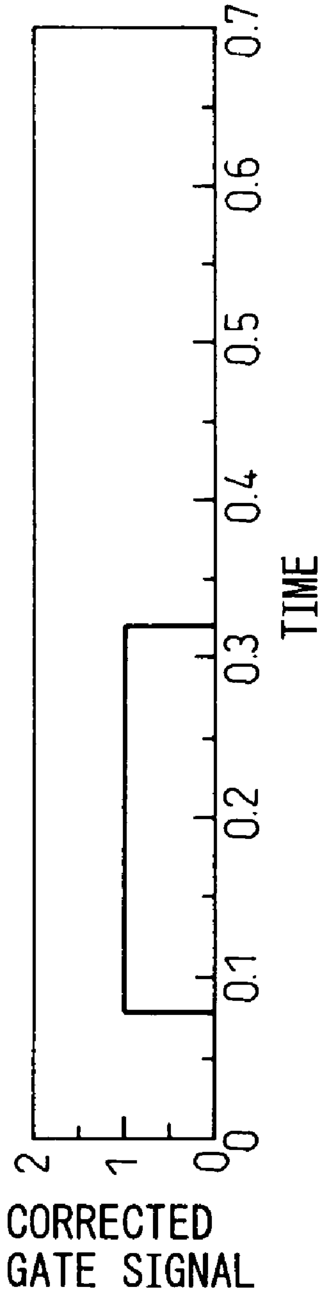

In the above embodiment, the reason that the threshold time $Dt_{th}$ is set to 25 milliseconds (a time longer than 25 milliseconds corresponds to a frequency lower than 40 Hz) is that the pitch frequency of a human voice being lower than 40 Hz is hardly possible. The corrected gate signal generated in the second gate signal generation routine is shown in FIG. 18F, from which it can be seen that the corrected gate is closed without being affected by the noise-induced pitch frequency (marked by ○ in FIG. 18D).

The speech section can be detected accurately by using the above corrected gate, but further accurate detection of the speech section can be achieved by solving the following problems.

1. As the gate is opened when the average value of three pitch frequencies becomes equal to or higher than the first threshold $Th_1$, the open timing tends to be delayed.

2. It is not possible to discriminate between large-amplitude single-shot noise and a speech signal.

3. It is not possible to discriminate between an aspirated sound and noise.

4. It is not possible to detect a glottal stop sound since the amplitude of glottal stop sound is small.

The present invention solves the above problems by introducing a speech section signal which is controlled in the following manner by the gate signal (including the corrected gate signal). That is, to solve the problems 1, 2, and 3, when the gate signal has remained open for a time equal to or longer than a first prescribed period (for example, 50 milliseconds), the speech section signal is set open by going back in time (retroacting) for a second prescribed period (for example, 100 milliseconds) from the current point in time. To solve the problem 4, the speech section signal is maintained in the open state for a third prescribed period (for example, 150 milliseconds) from the moment the gate signal is closed.

Figure 20:
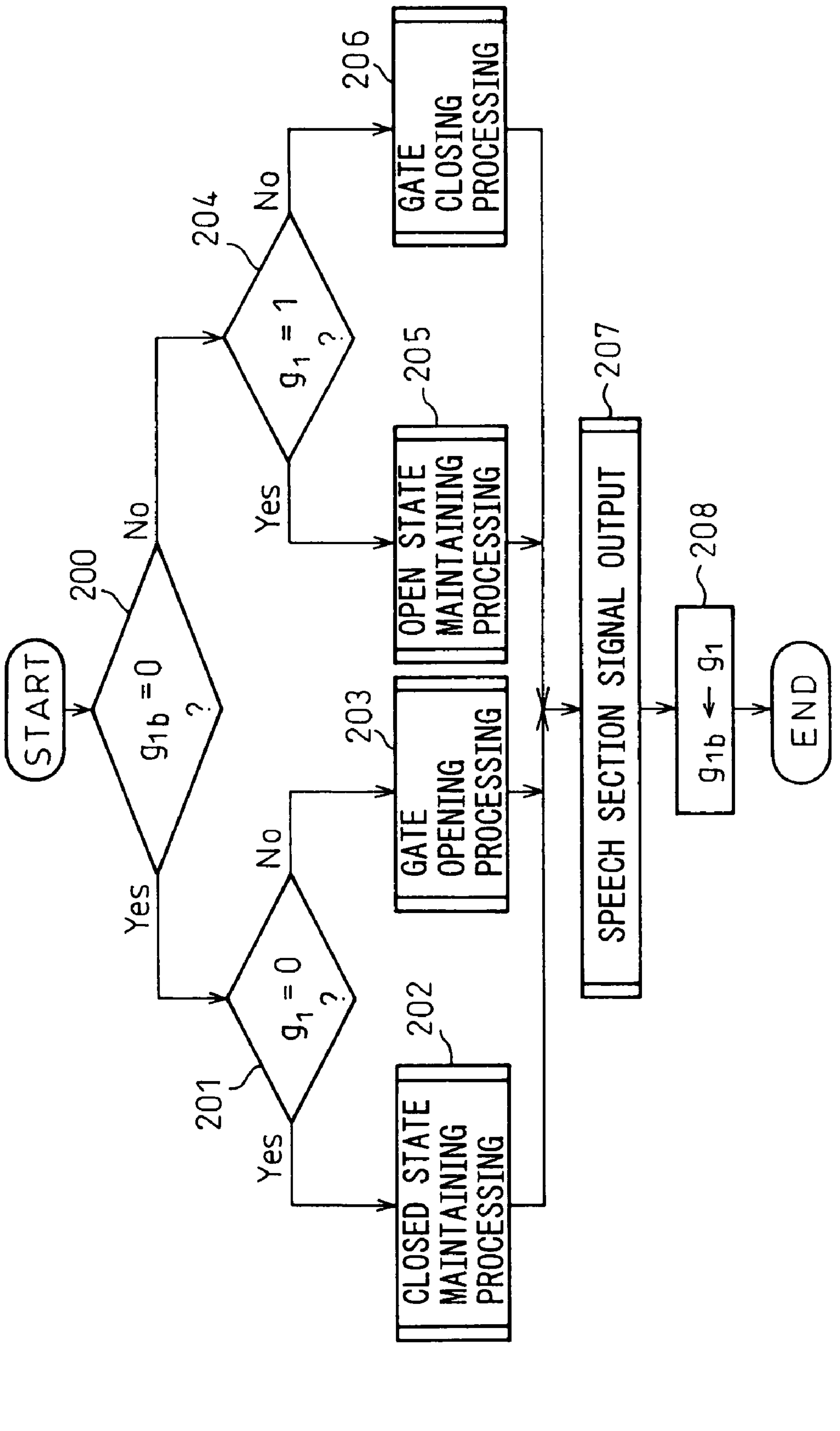
FIG. 20 is a flowchart illustrating a speech section signal generation routine.

FIG. 20 is a flowchart illustrating a speech section signal generation routine to be executed in the speech section signal generator 27. First, in step 200, it is determined whether or not the previously calculated gate signal $g_{1b}$ is "0", that is, whether or not the gate was closed. If the answer in step 200 is Yes, that is, if the gate was closed, then it is determined in step 201 whether the gate signal $g_1$ calculated this time is "0", that is, whether the gate remains closed.

If the answer in step 201 is Yes, that is, if the gate remains closed, closed state maintaining processing is performed in step 202, after which the process proceeds to step 207. If the answer in step 201 is No, that is, if the gate that was closed is now open, gate opening processing is performed in step 203, after which the process proceeds to step 207.

On the other hand, if the answer in step 200 is No, that is, if the gate was open, then it is determined in step 204 whether the gate signal $g_1$ calculated this time is "1", that is, whether the gate remains open. If the answer in step 204 is Yes, that is, if the gate remains open, open state maintaining processing is performed in step 205, after which the process proceeds to step 207. If the answer in step 204 is No, that is, if the gate that was open is now closed, gate closing processing is performed in step 206, after which the process proceeds to step 207.

In step 207, the speech section signal is output, and in the next step 208, the previously calculated gate signal $g_{1b}$ is updated to the gate signal $g_1$ calculated this time, after which the routine is terminated.

Figure 21:
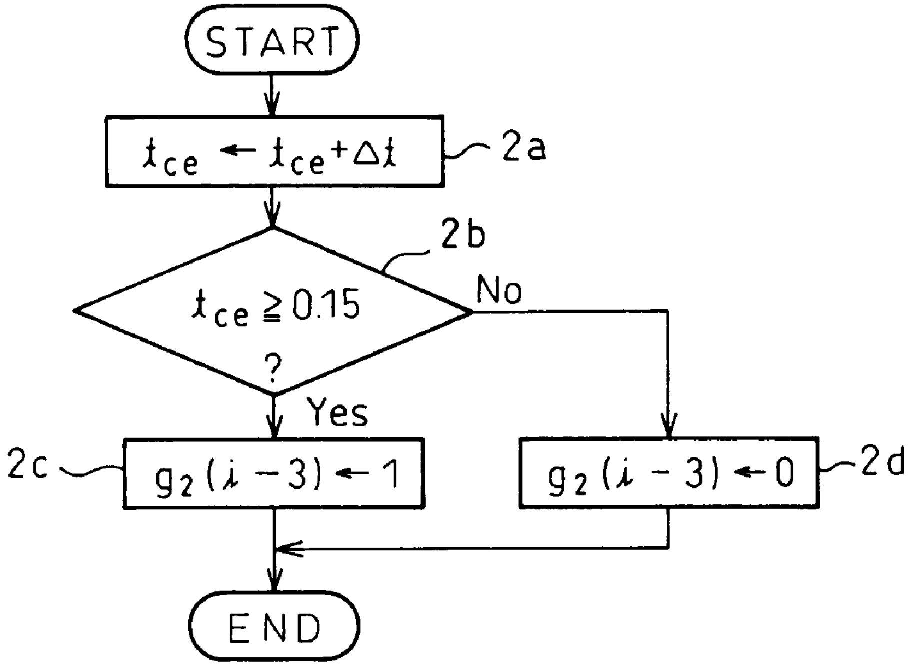
FIG. 21 is a flowchart illustrating a closed state maintaining processing routine.

FIG. 21 is a flowchart illustrating the closed state maintaining processing routine to be executed in step 202 in the speech section signal generation routine. First, in step 2*a*, the sampling time $\Delta t$ is added to the closed state maintaining time $t_{ce}$ indicating the time that the gate signal $g_1$ has remained closed. Next, in step 2*b*, it is determined whether the closed state maintaining time $t_{ce}$ is either equal to or longer than the 150 milliseconds defined as the third prescribed period.

If the answer in step 2*b* is Yes, that is, if 150 milliseconds have elapsed from the time the gate signal $g_1$ was closed, then $g_2(i-3)$ as the speech section signal when the index indicating the processing time instant is (i−3) is set to "1" in step 2*c*, after which the routine is terminated. On the other hand, if the answer in step 2*b* is No, that is, if 150 milliseconds have not yet elapsed from the time the gate signal $g_1$ was closed, the speech section signal $g_2(i-3)$ at the processing time instant (i−3) is set to "1" in step 2*d*, after which the routine is terminated.

Figure 22:
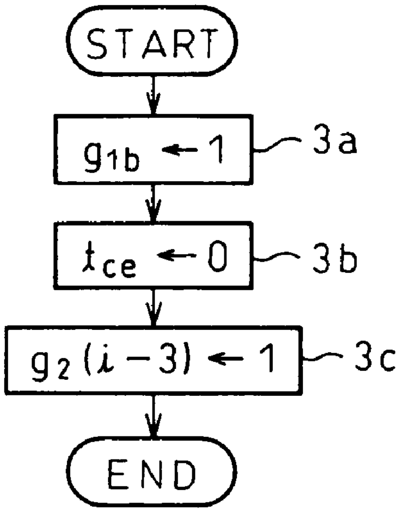
FIG. 22 is a flowchart illustrating a gate opening processing routine.

FIG. 22 is a flowchart illustrating the gate opening processing routine to be executed in step 203 in the speech section signal generation routine. First, in step 3*a*, the previously calculated gate signal $g_{1b}$ is set to "1". Next, in step 3*b*, the closed state maintaining time $t_{ce}$ is reset to "0", and in step 3*c*, $g_2(i-3)$ as the speech section signal when the index indicating the processing time instant is (i−3) is set to "1", after which the routine is terminated.

Figure 23:
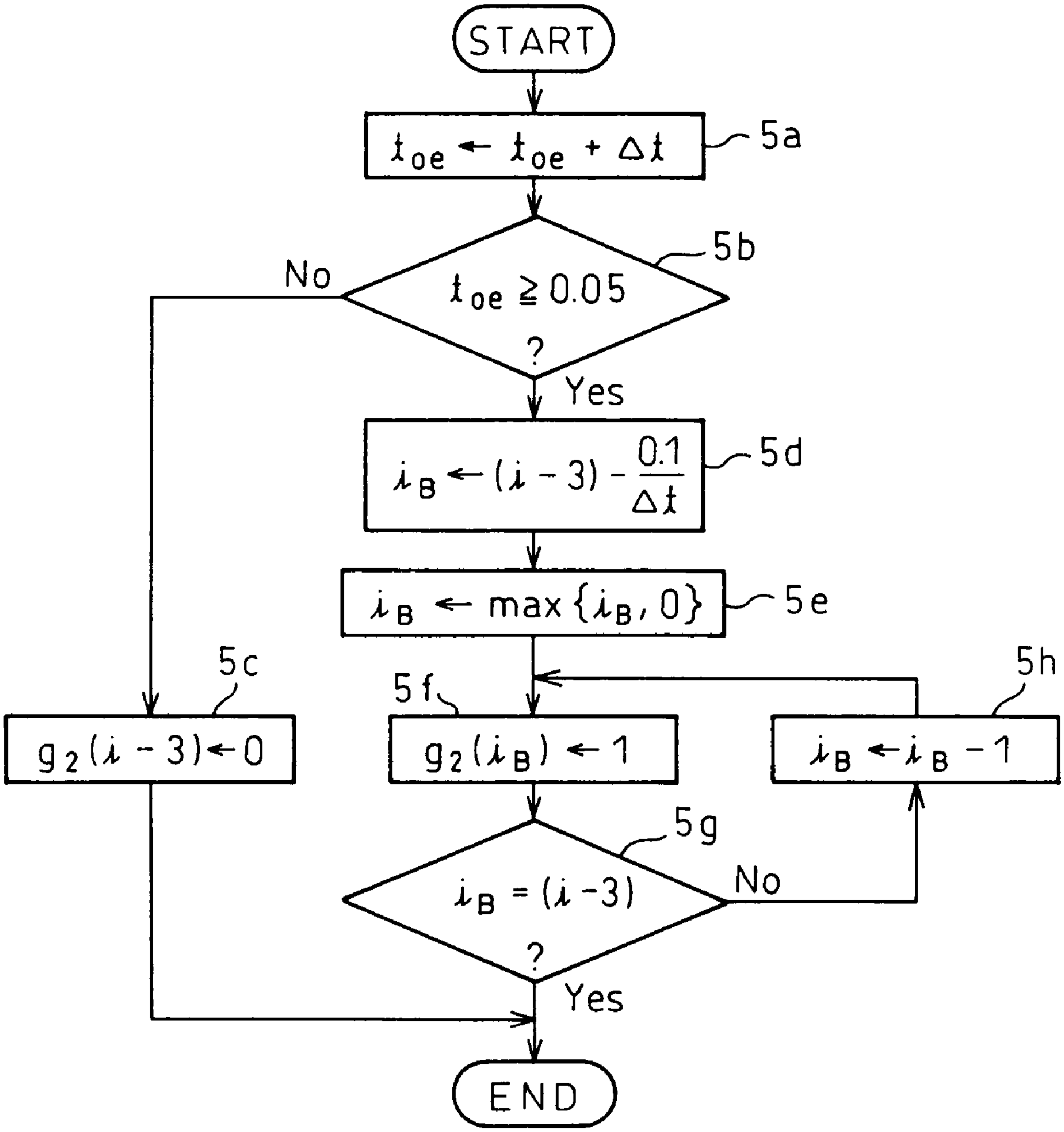
FIG. 23 is a flowchart illustrating an open state maintaining processing routine.

FIG. 23 is a flowchart illustrating the open state maintaining processing routine to be executed in step 205 in the speech section signal generation routine. First, in step 5*a*, the sampling time $\Delta t$ is added to the open state maintaining time $t_{ce}$ indicating the time that the gate signal $g_1$ has remained open. Next, in step 5*b*, it is determined whether the open state maintaining time $t_{ce}$ is either equal to or longer than the 50 milliseconds defined as the first prescribed period.

If the answer in step 5*b* is No, that is, if 50 milliseconds have not yet elapsed from the time the gate signal $g_1$ was opened, then $g_2(i-3)$ as the speech section signal when the index indicating the processing time instant is (i−3) is set to "0" in step 5*c*, after which the routine is terminated.

If the answer in step 5*b* is Yes, that is, if 50 milliseconds have elapsed from the time the gate signal $g_1$ was opened, the index $i_B$ indicating the time instant that is 100 milliseconds, i.e., the second prescribed period, back from the processing time instant is calculated by the following equation.

$$i_B \leftarrow (i-3) - 0.1/\Delta t$$

Here, the second term on the right-hand side indicates the number of samplings occurring in the 100-millisecond period. In step 5*e*, the index $i_B$ is set not smaller than zero in order to prevent going back into a region where no speech signal is present.

In step 5*f*, $g_2(i_B)$ as the speech section signal when the index indicating the time instant is $i_B$ is set to "1". In step 5*g*, it is determined whether the index $i_B$ is equal to the index (i−3) indicating the processing time instant, that is, whether the time has been made to go back for the second prescribed period. If the answer is No, that is, if the going back of time (retroaction) is not completed yet, the index $i_B$ is decremented in step 5*h*, and the process returns to step 5*f*. On the other hand, if the answer in step 5*g* is Yes, that is, if the going back of time is completed, the routine is terminated.

Figure 24:
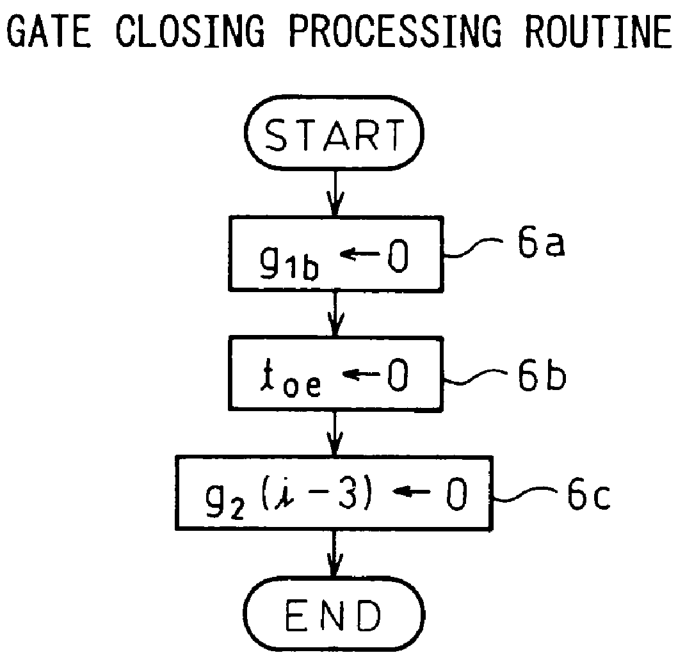
FIG. 24 is a flowchart illustrating a gate closing processing routine.

FIG. 24 is a flowchart illustrating the gate closing processing routine to be executed in step 206 in the speech section signal generation routine. First, in step 6*a*, the previously calculated gate signal $g_{1b}$ is set to "0". Then, in step 6*b*, the open state maintaining time $t_{ce}$ is reset to "0", and in step 6*c*, $g_2(i-3)$ as the speech section signal when the index indicating the processing time instant is (i−3) is set to "0", after which the routine is terminated.

Figure 25:
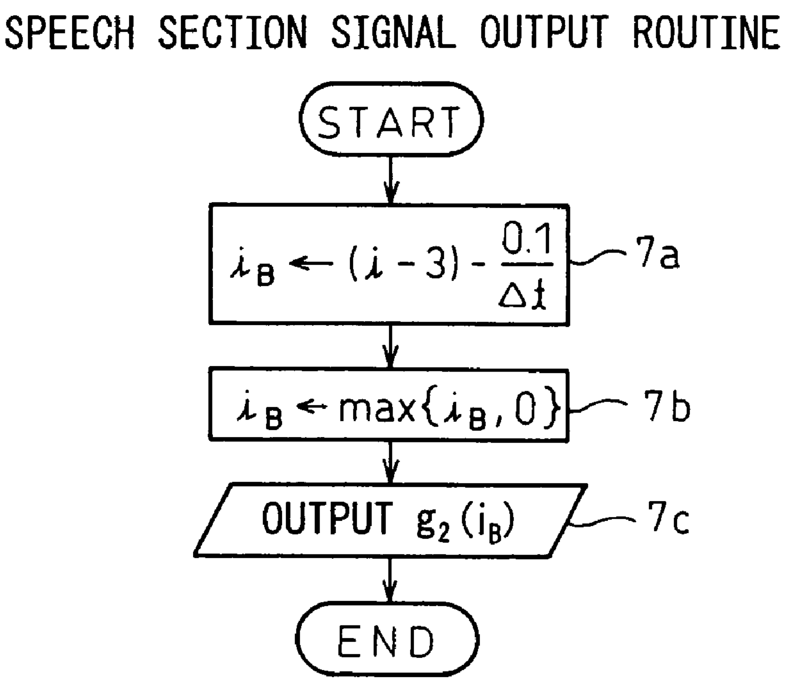
FIG. 25 is a flowchart illustrating a speech section signal output routine.

FIG. 25 is a flowchart illustrating the speech section signal output routine to be executed in step 207 in the speech section signal generation routine. First, in step 7*a*, the index $i_B$ indicating the time instant that is 100 milliseconds, i.e., the second prescribed period, back from the processing time instant is calculated by the following equation.

$$i_B \leftarrow (i-3) - 0.1/\Delta t$$

In step 7*b*, the index $i_B$ is set not smaller than zero in order to prevent the time from going back into a region where no speech signal is present, and in step 7*c* $g_2(i_B)$ is output, after which the routine is terminated.

Figure 26:
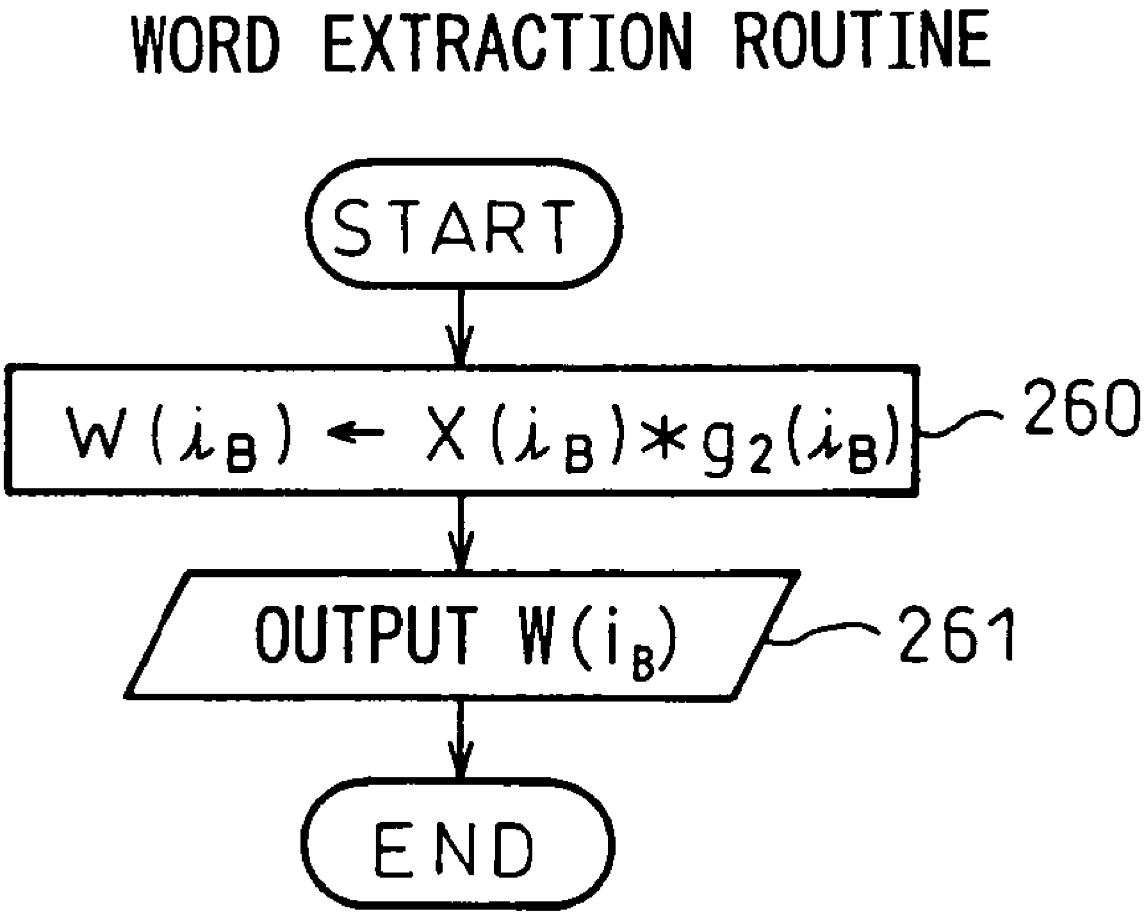
FIG. 26 is a flowchart illustrating a word extraction routine.

FIG. 26 is a flowchart illustrating a word extraction routine to be executed in the word extractor 28. First, in step 260, the word signal $W(i_B)$ when the index indicating the time instant is $i_B$ is calculated by the following equation.

$$W(i_B) \leftarrow X(i_B) * g_2(i_B)$$

Here, $X(i_B)$ is the speech signal stored in the memory 24. In step 261, $W(i_B)$ is output, after which the routine is terminated.

As described above, according to the speech section detection apparatus in the first aspect of the invention, the gate signal is controlled based on the speech pitch extracted by processing the speech signal in time domain, and the speech section is detected based on the gate signal; accordingly, the speech section can be detected using simple configuration.

According to the speech section detection apparatus in the second aspect of the invention, it becomes possible to segment the speech signal into a plurality of speech sections, based on the speech section.

According to the speech section detection apparatus in the third aspect of the invention, as the speech section is detected based on the speech pitch extracted by processing the speech signal in time domain, the speech section can be detected in near real time.

According to the speech section detection apparatus in the fourth aspect of the invention, it becomes possible to suppress variations in the amplitude of the speech signal.

According to the speech section detection apparatus in the fifth aspect of the invention, it becomes possible to reliably remove noise contained in the speech signal.

According to the speech section detection apparatus in the sixth aspect of the invention, it becomes possible to reliably extract the speech pitch because the amplitude of the speech signal is made essentially constant.

According to the speech section detection apparatus in the seventh aspect of the invention, it becomes possible to prevent the introduction of noise by re-setting the constant-amplitude gain to unity gain when the constant-amplitude gain is equal to a predetermined threshold value.

According to the speech section detection apparatus in the eighth aspect of the invention, it becomes possible to prevent the gate signal from being erroneously opened by being affected by noise.

According to the speech section detection apparatus in the ninth aspect of the invention, it becomes possible to prevent the gate signal from being erroneously closed by being affected by noise.

According to the speech section detection apparatus in the 10th aspect of the invention, it becomes possible to reliably close the gate signal when the speech pitch is no longer extracted.

According to the speech section detection apparatus in the 11th aspect of the invention, it becomes possible to compensate for a delay in closing the gate signal and also to reliably eliminate noise by discriminating noise from an aspirated sound.

According to the speech section detection apparatus in the 12th aspect of the invention, it becomes possible to reliably detect a glottal stop sound whose amplitude is small.

According to the speech section detection apparatus in the 13th aspect of the invention, it becomes possible to prevent erroneous detection even when one speech section overlaps with another speech section.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A speech section detection apparatus comprising:

preprocessing means for removing noise contained in a speech signal;

speech pitch extracting means for extracting a speech pitch signal from the speech signal from which noise has been removed by the preprocessing means;

gate signal generating means for generating a gate signal based on the speech pitch extracted by the speech pitch extracting means; and speech section signal generating means for generating a speech section signal based on the gate signal generated by the gate signal generating means;

wherein the speech pitch extracting means comprises:

subtraction processing means for applying subtraction processing for removing any speech signal smaller than a prescribed amplitude, to the speech signal from which noise has been removed by the preprocessing means;

constant amplitude means for making essentially constant the amplitude of the speech signal to which the subtraction processing has been applied by the subtraction processing means;

negative peak emphasizing means for detecting a positive peak and a negative peak subsequent to the positive peak from the speech signal the amplitude of which has been made essentially constant by the constant amplitude means, and for generating a speech signal the negative peak of which is emphasized by subtracting the positive peak from the negative peak; and differentiating means for detecting the speech signal the negative peak of which has been emphasized by the negative peak emphasizing means, and for differentiating the detected signal.

2. A speech section detection apparatus as claimed in claim 1, further comprising speech signal segmenting means for segmenting the speech signal, from which noise has been removed by the preprocessing means, into a plurality of speech sections based on the speech section signal generated by the speech section signal generating means.

3. A speech section detection apparatus as claimed in claim 1, wherein the subtraction processing means comprises:

envelope difference calculating means for calculating a positive envelope and a negative envelope of the speech signal from which noise has been removed by the preprocessing means, and for calculating an envelope difference representing the difference between the positive envelope and the negative envelope;

subtraction processing threshold value calculating means for calculating a subtraction processing threshold value by multiplying the envelope difference calculated by the envelope difference calculating means by a prescribed coefficient factor; and subtraction processing threshold value subtracting means for subtracting the subtraction processing threshold value from the amplitude of the speech signal when the amplitude of the speech signal from which noise has been removed by the preprocessing means is equal to or greater than the subtraction processing threshold value calculated by the subtraction processing threshold value calculating means.

4. A speech section detection apparatus as claimed in claim 3, wherein the subtraction processing means further comprises:

zero setting means for setting the amplitude of the speech signal to zero when the amplitude of the speech signal from which noise has been removed by the preprocessing means is smaller than the subtraction processing threshold value calculated by the subtraction processing threshold value calculating means.

5. A speech section detection apparatus as claimed in claim 1, wherein the constant amplitude means comprises:

envelope difference calculating means for calculating a positive envelope and a negative envelope of the speech signal from which noise has been removed by the preprocessing means, and for calculating an envelope difference representing the difference between the positive envelope and the negative envelope;

maximum envelope difference holding means for holding a maximum envelope difference out of envelope differences previously calculated by the envelope difference calculating means; and constant-amplitude gain calculating means for calculating a constant-amplitude gain by dividing, by the present envelope difference, the maximum envelope difference held by the maximum envelope difference holding means.

6. A speech section detection apparatus as claimed in claim 5, wherein the constant amplitude means further comprises:

unity gain setting means for setting the constant-amplitude gain to unity gain when the constant-amplitude gain calculated by the constant-amplitude gain calculating means is equal to or larger than a predetermined threshold value.

7. A speech section detection apparatus as claimed in claim 1, wherein the gate signal generating means comprises:

gate signal opening means for opening the gate signal when an average value taken over a predetermined number of consecutive speech pitches extracted by the speech pitch extracting means becomes equal to or larger than a predetermined gate opening threshold value.

8. A speech section detection apparatus as claimed in claim 7, wherein the gate signal generating means further comprises:

gate signal open state maintaining means for maintaining the gate signal in an open state once the gate signal is opened by the gate signal opening means, as long as the average value of the predetermined number of consecutive speech pitches extracted by the speech pitch extracting means does not become smaller than a gate closing threshold value which is smaller than the gate opening threshold value.

9. A speech section detection apparatus as claimed in claim 8, wherein the gate signal generating means further comprises:

gate signal closing means for closing the gate signal when the average value of the predetermined number of consecutive speech pitches extracted by the speech pitch extracting means becomes smaller than the gate closing threshold value.

10. A speech section detection apparatus as claimed in claim 1, wherein the speech section signal generating means comprises:

first prescribed period counting means for counting a first prescribed period from the time the gate signal generated by the gate signal generating means is opened; and speech section signal opening means for setting the speech section signal open by going back in time for a second prescribed period from the time the counting of the first prescribed period by the first prescribed period counting means is completed.

11. A speech section detection apparatus as claimed in claim 10, wherein the speech section signal generating means further comprises:

third prescribed period counting means for counting a third prescribed period from the time the gate signal generated by the gate signal generating means is closed; and speech section signal closing means for closing the speech section signal when the counting of the third prescribed period by the third prescribed period counting means is completed.

12. A speech section detection apparatus as claimed in claim 11, wherein the speech section signal generating means further comprises:

speech section signal open state maintaining means for maintaining the speech section signal in an open state when the speech section signal is set open by the speech section signal opening means by going back in time for the second prescribed period before the counting of the third prescribed period by the third prescribed period counting means is completed.

* * * * *

UNITED STATES PATENT AND TRADEMARK OFFICE

CERTIFICATE OF CORRECTION

PATENT NO. : 7,231,346 B2
APPLICATION NO. : 10/401107
DATED : June 12, 2007
INVENTOR(S) : Toshitaka Yamato et al.

It is certified that error appears in the above-identified patent and that said Letters Patent is hereby corrected as shown below:

On the Title Page

| | |
|---|---|
| (56) References Cited<br>Foreign Patent Documents<br>JP 9-50297 | Delete "2/1987",<br>Insert --2/1997-- |

Signed and Sealed this

Twentieth Day of May, 2008

JON W. DUDAS
*Director of the United States Patent and Trademark Office*

UNITED STATES PATENT AND TRADEMARK OFFICE

CERTIFICATE OF CORRECTION

PATENT NO. : 7,231,346 B2
APPLICATION NO. : 10/401107
DATED : June 12, 2007
INVENTOR(S) : Toshitaka Yamato et al.

It is certified that error appears in the above-identified patent and that said Letters Patent is hereby corrected as shown below:

<u>On the Title Page</u>

Item (73) Assignee — After "Kobe-shi (JP)",
Insert --and Tsuru Gakuen, Hiroshima-shi (JP)--

Signed and Sealed this

Thirtieth Day of September, 2008

JON W. DUDAS
*Director of the United States Patent and Trademark Office*